(12) United States Patent
Cantolino

(10) Patent No.: US 12,033,821 B1
(45) Date of Patent: Jul. 9, 2024

(54) LATCHING MAGNETIC FLOAT SWITCH

(71) Applicant: DiversiTech Corporation, Duluth, GA (US)

(72) Inventor: Christopher Cantolino, Bradenton, FL (US)

(73) Assignee: DiversiTech Corporation, Duluth, GA (US)

( * ) Notice: Subject to any disclaimer, the term of this patent is extended or adjusted under 35 U.S.C. 154(b) by 0 days.

(21) Appl. No.: 17/741,262

(22) Filed: May 10, 2022

Related U.S. Application Data

(63) Continuation of application No. 17/507,780, filed on Oct. 21, 2021, which is a continuation-in-part of application No. 16/873,260, filed on Mar. 6, 2020, now Pat. No. 11,322,323.

(60) Provisional application No. 62/856,620, filed on Jun. 3, 2019.

(51) Int. Cl.
*H01H 36/02* (2006.01)
*G01M 3/40* (2006.01)
*G08B 21/20* (2006.01)

(52) U.S. Cl.
CPC .............. *H01H 36/02* (2013.01); *G01M 3/40* (2013.01); *G08B 21/20* (2013.01)

(58) Field of Classification Search
CPC ......... H01H 36/0073; H01H 2225/014; H01H 23/162; H01H 35/18; H01H 23/02; H01H 5/18
See application file for complete search history.

(56) References Cited

U.S. PATENT DOCUMENTS

| | | | |
|---|---|---|---|
| 3,052,778 A | | 9/1962 | Kathe |
| 3,273,091 A | * | 9/1966 | Wales, Jr. .......... H01H 36/0073 336/DIG. 1 |
| 3,743,980 A | | 7/1973 | Steiner |
| 4,056,979 A | * | 11/1977 | Bongort .................. G01F 23/74 73/DIG. 5 |
| 4,489,297 A | * | 12/1984 | Haydon ............. H01H 36/0073 200/557 |
| 6,140,925 A | * | 10/2000 | Lee ......................... G01F 23/74 340/623 |

(Continued)

FOREIGN PATENT DOCUMENTS

WO WO2006052250 A1 5/2006

*Primary Examiner* — Bernard Rojas
(74) *Attorney, Agent, or Firm* — Dentons US LLP

(57) ABSTRACT

A latching magnetic float switch with a single fastener mounting clamp and pivoting toggle bar magnet interrupting an electrical circuit to stop fluid production once actuated by an initially offset float magnet first rotating a small distance in response to liquid accumulation in the collection pan upon which the switch is mounted, the float magnet then achieving a strong snap-locked latching magnetic engagement with the toggle bar magnet solely through building magnetic attraction between them, engagement continuing until the float magnet is manually reset into its original offset positioning. The 2-part clamp with a rotating curved/bowed clamp arm can mount the switch securely to both metal and plastic liquid collection pans with differing draft angles, and also provides a clamp base configured for elevation adjustment of the float housing relative to pans having different wall height dimensions and fluid production shut off when detected fluid depth is less than 0.5 inches.

32 Claims, 20 Drawing Sheets

(56) References Cited

U.S. PATENT DOCUMENTS

| | | | |
|---|---|---|---|
| 6,442,955 B1 * | 9/2002 | Oakner | H01H 36/02 340/618 |
| 6,550,264 B1 | 4/2003 | Cantolino | |
| 6,895,771 B1 | 5/2005 | Cantolino | |
| 6,992,259 B1 | 1/2006 | Cantolino | |
| 6,992,260 B1 | 1/2006 | Cantolino | |
| 7,067,750 B1 * | 6/2006 | Cantolino | H01H 35/18 200/84 R |
| D527,793 S | 9/2006 | Cantolino | |
| D562,963 S | 2/2008 | Cantolino | |
| 7,334,421 B1 | 2/2008 | Cantolino | |
| 7,389,651 B2 | 6/2008 | Cantolino | |
| 7,637,387 B1 | 12/2009 | Cantolino | |
| 7,673,646 B1 | 3/2010 | Cantolino | |
| 7,710,283 B1 * | 5/2010 | Cantolino | B60H 1/3225 340/623 |
| 7,744,395 B1 | 6/2010 | Cantolino | |
| D630,709 S | 1/2011 | Cantolino | |
| 7,878,019 B2 | 2/2011 | Cantolino | |
| 7,896,301 B1 | 3/2011 | Cantolino | |
| 7,900,795 B1 | 3/2011 | Cantolino | |
| 7,967,267 B1 * | 6/2011 | Cantolino | F24F 13/222 248/231.61 |
| 8,100,140 B1 | 1/2012 | Cantolino | |
| 8,151,621 B1 | 4/2012 | Cantolino | |
| 8,154,313 B1 | 4/2012 | Cantolino | |
| 8,169,314 B2 | 5/2012 | Cantolino | |
| 8,220,768 B1 | 7/2012 | Cantolino | |
| 8,317,169 B1 | 11/2012 | Cantolino | |
| 8,319,626 B1 | 11/2012 | Cantolino | |
| 8,461,493 B1 | 6/2013 | Cantolino | |
| 8,561,417 B1 | 10/2013 | Cantolino | |
| 8,578,770 B2 | 11/2013 | Cantolino | |
| 8,844,353 B2 * | 9/2014 | Hsiao | H01H 35/18 73/317 |
| 8,973,437 B2 | 3/2015 | Cantolino | |
| 9,038,405 B2 | 5/2015 | Cantolino | |
| 9,105,175 B1 | 8/2015 | Cantolino | |
| 9,249,981 B2 * | 2/2016 | Sada | F24F 11/52 |
| 9,503,015 B2 | 11/2016 | Cantolino | |
| 11,322,323 B1 * | 5/2022 | Cantolino | H01H 36/0073 |
| 2005/0166613 A1 * | 8/2005 | Oakner | F24F 13/222 62/150 |
| 2006/0042918 A1 | 3/2006 | Cantolino | |
| 2006/0222508 A1 | 10/2006 | Cantolino | |
| 2011/0181380 A1 * | 7/2011 | Iwata | H01H 23/168 335/63 |
| 2012/0053736 A1 | 3/2012 | Cantolino | |
| 2012/0219428 A1 | 8/2012 | Cantolino | |
| 2014/0008253 A1 | 1/2014 | Cantolino | |
| 2014/0102123 A1 | 4/2014 | Cantolino | |
| 2015/0000193 A1 | 1/2015 | Cantolino | |
| 2015/0082697 A1 | 3/2015 | Cantolino | |

* cited by examiner

LATCHING MAGNETIC FLOAT SWITCH

CROSS-REFERENCES TO RELATED APPLICATIONS

This patent application is a Continuation-In-Part of U.S. utility patent application Ser. No. 17/507,780 filed Oct. 21, 2021, which is a Continuation-in-Part of U.S. utility patent application Ser. No. 16/873,260 filed Mar. 6, 2020, now U.S. Pat. No. 11,322,323 issued 3 May 2022, which claims a benefit of priority to U.S. provisional patent application 62/856,620, filed Jun. 3, 2019, each of which is herein incorporated by reference in its entirety for all purposes.

BACKGROUND OF THE INVENTION—FIELD OF THE INVENTION

This invention relates to fluid sensing devices used to selectively shut off electrical power to a fluid-producing system and/or activate an alarm (or other notification) in response to detection of liquid accumulation beyond a threshold amount calculated and/or otherwise predetermined to have the potential to place the system and/or its surroundings at risk for damage, specifically to a latching magnetic float switch that is wired into the electrical circuit of a fluid-producing system and promptly, after encountering only a very small amount of accumulated liquid in a drain pan in fluid communication with the fluid-producing system, generates a fast and strong snap-locked latching magnetic engagement of magnets together to create a TRIPPED state that interrupts electrical power to the associated fluid-producing system. Significantly, the TRIPPED state requires manual reset of the float magnet to its original offset RUN state position before additional fluid production by the system can occur. One contemplated use of the present invention is with a heating, ventilation, and air conditioning (HVAC) system, wherein its float housing (while protecting moving magnetic and electrical components) is securely installed onto the wall of a secondary drain pan in fluid communication with the HVAC system. Two different embodiments of clamp are proposed herein for float housing installation, both having a pivoting curved/bowed clamp arm usable with a base plate in fixed association with the float housing. The clamp arm and clamp base configurations in both clamp embodiments disclosed herein facilitate quick installation of the float housing onto a drain pan wall using only one externally-threaded fastener and an easily hand-manipulated nut or knob having an internally-threaded tubular extension sized for insertion through a central opening in the clamp arm. The clamp arm's curved/bowed configuration in both clamp embodiments also allows secure/fixed attachment of the clamp to a variety of plastic and metal pans having different upper wall configurations and differing draft angles. While both preferred embodiments of clamp disclosed herein have rugged construction to maintain fixed/stable installation of a float housing on a drain pan wall during long-duration liquid depth monitoring use, one present invention clamp embodiment also contains structure allowing float housing elevation adjustment relative to the interior bottom surface of its supporting fluid collection pan while the float housing remains in the same installation site on the pan wall. The fast in situ elevation adjustment of the float housing is a time-saving benefit for the installer and allows electrical power shut-off to the fluid-producing system when liquid accumulation depth in the supporting fluid collection pan is less than 0.5 inches (and as low as ⅜ inch). The low liquid accumulation depth initiating fluid-producing system shut-off safeguards the HVAC system, and also other valuables on site, since intermittent tripping and short cycling of the HVAC system never occurs. Present invention float and toggle bar magnets have initial positioning offset from one another and the toggle bar is preferably biased to maintain the initial gap between them. After a small amount of accumulated liquid from a drain pan enters the float housing through one or more bottom openings, the liquid presence initiates a slight forward pivoting rotation of the float assembly supporting the float magnet away from its offset RUN state positioning. Thereafter, and solely as a result of the increasing magnetic attraction building between the two magnets as the distance between them decreases (and not as a result of any additional liquid entry into the float housing), the float magnet reaches its raised TRIPPED state actuator position where the magnetic force between the two magnets is calculated to overcome all upward biasing influence on the toggle bar magnet, and the float magnet becomes a switch actuator for the toggle bar magnet causing it to shut-off fluid production when the toggle bar magnet undergoes fast downward movement toward the float magnet that results in a reliable and strong snap-locked latching magnetic engagement of the two magnets together. The strongly-latched TRIPPED state of the present invention remains until the float assembly and float magnet are manually reset into their offset and lowered RUN state position, which then allows the toggle bar magnet to return to its raised RUN state positioning, closing an electrical circuit to restore power to the HVAC (or other fluid-producing) system for resumed operation. Additionally, present invention float housing installation onto the wall of a fluid collection pan is always fast, and usually occurs in a few seconds, as follows. When the top of the clamp arm is pivotally engaged with the top of the clamp base (see FIG. 4), and the tubular extension of the nut/knob is partially inserted through the clamp arm's central opening 11, and the fastener head is also fixed against rotation with its externally-threaded body extending toward (and in alignment with) opening 11, manual rotation of the nut/knob progressively against the distal end of the externally-threaded fastener engages the fastener and moves the clamp arm toward the clamp base, tightening both clamp components securely over and against the opposed surfaces of a drain pan wall. Furthermore, release and/or reattachment of the present invention from/to its selected pan wall support location does not require complete separation of the nut/knob and fastener (just a partial unthreading of the nut/knob), saving time and providing convenience for the user. Preferred structure for elevation adjustment includes a key-to-keyway assembly and a fastener opening through the clamp base above its key [See FIG. 18]. Connective structure integral only to the float housing provides the vertically-extending keyway (see FIGS. 21/22). The fastener's externally-threaded body extends through/from the keyway toward the clamp arm, while its fastener head remains positioned in a shallow protective channel between connective structure integral to the float housing that closely surrounds it to prevent its rotation during fastener-to-nut/knob engagement and disengagement. To finish float housing fixed installation onto a drain pan wall, the fastener body extends through the upper portions of the clamp base and clamp arm, tightening them together into their installed positioning on a selected pan wall location when fully-threaded fastener engagement with the knob/nut extension is complete. Prior to vertical float housing movement during elevation adjustment, the nut/knob's engagement with the fastener must be slightly loosened (enough to allow manual up and down movement of the float housing but not enough to allow the clamp arm and clamp base to release their gripping lower portion engagement with the supporting pan wall). Once the desired float housing elevation relative to the interior bottom surface of the supporting fluid collection pan is reached, the nut/knob is fully tightened against the fastener to securely fix positioning of the clamp onto the pan wall and prevent further occurrence of float housing elevation change. In addition, the rugged construction used in the present invention clamp secures the float housing to a fluid collection pan with little or no lean-in of the pan wall at the site selected for present invention installation during long term use, an improvement over the prior art. Additional benefits of the present invention include easy operator viewing of a float status indicator through a float housing window that instantly shows whether the present invention float switch is currently in a RUN or TRIPPED state (preferred green color indicating a RUN state and a red color indicating a TRIPPED state, but not limited thereto); and easy switch testing and reset without removal of the present invention from its mounted position over a pan wall, which can lead to easier/faster diagnosis of excess fluid accumulation causes and reduced repair time and cost. Furthermore, the float housing configuration does not let positive or negative air pressure influence it sufficiently to cause the TRIPPED state, and the fixed/rigid connective structure geometry present between float housing and clamp base of the present invention that in addition to providing easy elevation adjustment of the float housing relative to a supporting drain pan wall, also distributes forces encountered during present invention use to better maintain stability of the float housing and its clamp so that they remain in secure/fixed positions relative to a supporting drain pan wall throughout their use.

Additionally, some of the present invention float assembly structure contributing to a rapid/strong snap-action shut off of a fluid-producing system may be varied, supplemented, or reinforced in differing embodiments thereof to adjust the timing and/or speed of the TRIPPED state response of the float and/or toggle bar magnets to address differing fluid-production site applications or needs. For example, float housing or float assembly structure (or both) could be varied slightly from that shown in the accompanying illustrations to define a different initial offset position (or orientation) for the pivoting lower float magnet (while in its pre-rotation lowered RUN state position) relative to that of the upper magnet (while it is in its initially raised RUN state position), which might require other adjustments as well (such as, but not limited to, changes in the size/strength of the supported magnet or magnets) according to the amount of magnetic attraction increase or decrease needed between them for the desired timing and speed of a fast, strong, and reliable snap-locking TRIPPED response. The present invention upper magnet is associated with one end of a pivoting toggle bar and initially in a raised position relative to its own lowered TRIPPED state positioning, and once downward movement of the upper magnet begins toward the float magnet already in its TRIPPED state position (and acting as an actuator for the toggle bar magnet), a fast downward snapping action of the upper magnet (caused by the high level of magnetic attraction now existing between the two magnets) locks them together in a strong magnetically-latched relation that requires manual reset before further fluid-producing system operation can occur. The lower magnet is seated on (or in) the upper portion of a pivotal float assembly. The upper/toggle bar magnet may have upward bias influencing it into its raised RUN state position in the form of magnetic attraction to one or more biasing pull pieces having magnetic properties (such as, but not limited to, a metal pin or socket screw) located above it and/or at least one coil spring below the pivoting toggle bar supporting the upper magnet used to selectively control the flow of electricity to a fluid-producing system, the biased RUN state remaining until sufficient excess fluid released by the associated fluid-producing system enters the present invention float housing through the at least one bottom opening to initiate a slight/small movement of the float body, the float frame, and the float magnet a short distance toward a fully pivoted TRIPPED position. The liquid present in the float housing (or later entering the bottom openings beneath the float housing) does not cause any additional movement of the float assembly and its supported float magnet toward its biased TRIPPED state actuator position since a combination of other geometry within the float housing is balanced to provide the needed strong magnetic attraction between the upper and lower magnets to rapidly overcome the initial upward biasing influence on the upper/toggle bar magnet used to maintain its RUN state positioning. Balance of the geometry and mechanics within the float housing is always achieved in preferred embodiments of the present invention so that liquid entering the float housing only moves the float assembly supporting the lower magnet a small distance away from its initial offset positioning relative to the upper toggle bar magnet, it is the ever increasing magnetic attraction between the upper and lower magnets (as the distance between them decreases) that builds rapidly and sufficiently to draw the lower magnet upward and into its elevated TRIPPED actuator position, and promptly thereafter causes the upper magnet to drop rapidly and sharply downward from its raised and upwardly-biased RUN state position into its lowered TRIPPED state position, and the two magnets thereafter becoming snap-locked together into a strong latching magnetic engagement (even though they do not achieve physical contact with one another) that opens the electrical circuit powering the associated fluid-producing system, appliance, or controller to shut off additional fluid production (and also maintain the interruption of electrical power until manual reset of float magnet positioning occurs via hand-manipulation of a float assembly projection that extends outwardly through an open vertically-extending channel in the float housing). Prior to manual reset, the dropping toggle bar magnet while moving downwardly toward its TRIPPED state position causes the opposed end of the pivoting toggle bar to become elevated (perhaps assisted by a second coil spring) which then may cause an electrical circuit to close, activate an alarm, provide a remote notification, or open/close an additional electrical circuit (other than the one in electrical communication with an associated fluid-producing system) to provide another communication or control activity. In summary, when the toggle bar magnet is upwardly biased to maintain its RUN state positioning, the lower float magnet initially remains offset from the upper toggle bar magnet, creating a gap that makes their magnetic fields less attractive to one another. To achieve the TRIPPED state actuator positioning, rising liquid in the fluid collection pan supporting the present invention float switch has to move through one or more fluid passage openings in the bottom of the float housing and initiate a small pivotal movement of the float assembly closer to the upper toggle bar magnet, which subsequently and progressively builds (as the distance between the two magnets decreases) and causes the float magnet to reach its predetermined TRIPPED state actuator position that further causes the combined magnetic attraction between the toggle bar and float magnets to overcome the upward biasing influence on the toggle bar magnet, resulting in a very rapid dropping of the toggle bar magnet and a strong snap-locked magnetic latching engagement of the two magnets as they come together, which thereafter requires manual reset intervention to return the present invention float magnet to its original offset lowered RUN state position. Thus, the forceful attraction exhibited in the present invention between its upper and lower magnets is multiplied and enhanced by varying combinations of other structure not presently contemplated in the prior art, and the stronger magnetic attraction created through a multiplication of factors (and not simply the buoyancy of a lightweight float body) provides enhanced reliability over prior art fluid sensor/switching devices for a trouble-free and reproducible/strong snap-locking action between the two magnets and reduced switch malfunction during long-term use.

BACKGROUND OF THE INVENTION—DESCRIPTION OF THE RELATED ART

The inventions thought to be the closest to the present invention are those previously created by the inventor herein and which are currently protected by U.S. Pat. No. 7,710,283 B1 to Cantolino (May 4, 2010) and U.S. Pat. No. 7,967,267 B1 to Cantolino (Jun. 28, 2011). Although each of the prior Cantolino switches mentioned above are also latching switches which need to be reset after entering a TRIPPED state, neither has the same combination of rapid/snap-action promoting structure as is included in the present invention herein (that can be variably manipulated for successful adaptation and long-term use in new applications) with its lower float magnet originally offset to an upper magnet on a toggle bar, biasing structure (such as but not limited to a contact spring and/or biasing pull piece with magnetic properties) used to maintain a gap between the magnets and continued operation of an associated fluid-producing system until a small amount of float assembly movement occurs (initiated by a predetermined depth of liquid accumulation in the fluid collection pan upon which the present invention's float housing is supported during use) and leads to magnetically-accelerated movement of the lower magnet toward its TRIPPED state actuator position that overcomes the biasing influence maintaining the upper toggle bar magnet in its elevated RUN state positioning, wherein the upper toggle bar magnet drops rapidly downward and achieves a fast and strong snap-locked latching magnetic engagement with the float magnet that shuts off additional fluid production. The present invention also has faster and more stable installation over the wall of a fluid collection pan, as well as a more reliable and reproducible shut off of an associated fluid-producing system and reduced malfunction during long-term use. There is no known invention with the same structure and benefits provided by the present invention disclosed herein.

SUMMARY OF THE INVENTION

The primary objective of this invention is to provide a float switch activated by a strong magnetic attraction created through a multiplication of factors (and not simply the buoyancy of a lightweight float body), which confers enhanced reliability over prior art switches for a trouble-free and reproducible/strong snap-locked latching magnetic engagement between the two magnets brought successively together into their respective TRIPPED state positions, and also reduces switch malfunction during long-term use. It is a further object of this invention to provide a float switch that is easily installed and removed, is easily tested at any time to ascertain proper working order without removal from its installation site, and has reliable operation for extended periods of time with little or no pan lean-in that would otherwise require periodic post-installation inspection or maintenance. It is also an object of this invention to provide a float switch that effectively operates when only a very small threshold amount of liquid is present in the fluid collection pan that supports it, and has a float housing configuration allowing easy elevation adjustment during installation (and otherwise when needed) without removal of its associated clamp from its installed position over and against the opposing wall surfaces of a supporting fluid collection pan (just a slight loosening of the fastener holding the clamp arm to the clamp base). In addition, it is an object of this invention to provide a float switch and clamp combination with sturdy and rugged construction, as well as stable mounting to a pan wall so that it resists deviation from its originally-installed positioning during extended periods of use. It is also an object of this invention to provide a float switch made from corrosion-resistant materials that resist premature deterioration and malfunction. A further object of this invention is to provide a float switch made of materials able to reliably operate in temperature extremes. It is also an object of this invention for its float housing to protect its float assembly from airborne debris and airlock malfunction.

The present invention has a pivoting curved/bowed clamp arm and an easily hand-manipulated fastener/nut (or fastener/knob) combination for fast and easy installation of an associated float housing onto the wall of both plastic and metal fluid collection pans with differing height dimensions, upper wall shapes, and wall draft angles, particularly those in current use for HVAC applications. Two preferred embodiments of clamp are disclosed herein, a first preferred embodiment of clamp having fastener stabilizing structure 15 that is shown in FIGS. 1-8 and a second preferred embodiment of clamp identified by the number 39' and having the fastener stabilizing structure 15' shown in FIGS. 17-22. The sturdy and rugged construction of both float housing and clamp fixes the present invention in a stable and immobile mounted position over and against the opposing surfaces of a drain pan wall, while also reducing the amount of lean-in of a supporting fluid-collection pan wall at the site of present invention installation, a known problem in prior art shut-off switch use. As a result, little or no deviation of the float housing from its originally installed position occurs during extended periods of use, which increases the overall reliability of the present invention switch function during its use for fluid-producing system shut-off. Also, the vertically-moving float assembly has a lower frame with a free end projection (positioned remotely from its anchored end) that moves with float assembly and provides a visual indicator of current float positioning and status, and also allows for easy testing of the present invention in situ at any time to ascertain whether it is in proper working order without its removal from a supporting pan wall and a need for replacement/adjustment after testing is complete. The present invention is configured to operate when only a small threshold amount of liquid is present (less than ½-inch depth and optimally as low as a ⅜-inch depth for HVAC use), it is made from corrosion-resistant materials that resist premature deterioration and malfunction, made of materials able to reliably operate in temperature extremes, and its float housing protects its float assembly from airborne debris and airlock malfunction. The combination of clamp advantages and benefits provided by the present invention herein, in addition to a strong/rapid snap-locking engagement of magnets for reliable operation and reduced switch malfunction during long-term use, is not presently known in prior art.

BRIEF DESCRIPTION OF THE SEVERAL VIEWS OF THE DRAWINGS

FIG. 1 also shows the float housing further having an open and vertically-extending open channel (marked with the number 18 in FIG. 3) through which the movable free end projection of the pivoting float frame extends for use in testing proper switch function (without moving the present invention from its fixed position of use on a fluid collection pan wall) and also for use in manual reset of the float magnet into its lowered RUN state position so that after the strong snap-locked magnet latching of magnets has occurred to shut off fluid production, the toggle bar magnet is then allowed to return to its raised RUN state position and restore power to the associated fluid-producing system. FIG. 1 further shows a first preferred embodiment of wall-mounting clamp having an enlarged hand-manipulated nut (or knob) that is used with one threaded fastener (extending between the clamp arm and clamp base and not visible in FIG. 1) to secure the float housing in a fixed position relative to the wall of a fluid collection pan for reliable and extended trouble-free switch operation. The clamp base has fixed association with the float housing via connective structure (a small portion thereof is visible in FIG. 1 directly under the central portion of the base plate, and also visible in FIGS. 2-5, but does not have a numerical designation). In addition, FIG. 1 shows the clamp arm having a curved/bowed and generally C-shaped configuration and top pivoting connection to the clamp base via its integral pivot pin and the receiving notches formed into the top edge of the clamp base.

FIG. 2 also shows the configuration and positioning of cap top and wiring harness preferred in the present invention.

FIG. 3 further shows preferred vertical alignment of the base plate notches with the gripping surface on the vertically-extending lower portion of the base plate (and slightly forward from the base plate vertically-extending surface positioning), a wiring harness extending upwardly from the cap top, molded/rigid connective structure fixing the clamp base to the float housing, a vertically-extending open channel in the float housing through which the free end projection of the float frame extends, and a trip indicator window above the open channel and through which the current RUN or TRIPPED state of the present invention switch is readily viewed by an observer.

FIG. 5 further shows a non-slip/textured/gripping surface on the lower portion of the C-shaped clamp arm that helps to secure the float housing and its supported cap top in a fixed position relative to the wall of a fluid collection pan during long term use. A non-slip/textured/gripping surface is also shown in FIG. 4 associated with the lower portion of the clamp base. The non-slip/textured/gripping surface may be integral to the clamp arm and/or clamp base, or formed with added/overmold material.

FIG. 6 further shows the clamp base in the first preferred embodiment of present invention clamp having an upper portion used for connection thereof to the top portion of a clamp arm via a threaded fastener, a vertically-extending lower portion with gripping structure or added features used for non-slip engagement thereof with one of the opposed surfaces of a fluid collection pan wall, and the upper and lower clamp portions further separated from one another by a wide clamp-strengthening U-shaped member extending horizontally outward from the vertically-extending surface of the clamp base (securely fixed on its reverse side to the exterior surface of the float housing via connective structure).

FIG. 9 also shows the pivoting free end projection of the float frame that is used for testing the present invention for its proper operation and also used for manual reset of the float assembly to restore electrical power to the associated fluid-producing system for its resumed operation.

FIG. 11 also shows the non-elevating end of the float frame secured to the float pivot at one end of the interior surface of the base plate and the opposed upwardly-elevating free end projection of the float frame having an elongated projection adapted for extension through the float housing's open channel to use for manual reset of float assembly positioning (and its supported magnet) from its elevated TRIPPED state actuator position to its lowered and offset RUN state position. The same movable free end projection is also used to test proper float switch function while the float housing remains in its selected and installed position of use on a supporting pan wall, providing a time-saving and convenient advantage to users.

FIG. 16 further shows the TRIPPED positioning of both magnets causing the paired electrical contacts adjacent to the toggle bar magnet to be open and interrupt electrical power to an associated fluid-producing system through the wiring harness, and the second set of paired electrical contacts associated with the opposed end of the toggle bar magnet now closed against one another, and if wired into another electrical circuit could provide notification in a variety of forms regarding the fluid-producing system shut-off.

FIG. 17 shows a curved/bowed and generally J-shaped (or C-shaped) clamp arm with a keyhole-shaped opening (key-hole shape is preferred, but not critical) positioned centrally through the upper portion of the clamp arm. The clamp arm opening is sized for insertion of the internally-threaded extension of an easily hand-manipulated nut (or knob) and extension alignment with an externally-threaded fastener body extending toward it and inserted through a centrally-positioned fastener hole in the clamp base. After insertion through the clamp base, the fastener head connected to one end of the fastener body becomes positioned above the key 42 (shown in FIG. 18) and located between the clamp base and the float housing or the cap top (instead of being positioned within a hollow receptacle situated between the clamp arm and clamp base as seen in FIG. 6 for the first preferred embodiment of clamp structure). FIG. 17 further shows a non-slip/textured/gripping surface on the lower and vertically-extending portion of the clamp base, and a fastener alignment spring through which the fastener becomes inserted during use and remains positioned between the upper portions of the clamp arm and clamp base when they are fixed together over and against the opposing surfaces of a supporting fluid collection pan wall. FIG. 17 also shows the flattened/rectangular configuration of fastener head preferred for facilitated float housing elevation adjustment, the split configuration on the top edges of the clamp base and clamp arm used for movement therethrough of a 3-sided upper extension of the connective structure integral to the float housing, a preferred flat surface on each of the two opposed integral pivot pins on the clamp arm, a spring-accommodating split in the horizontal and generally U-shaped invention stabilizing/strengthening structure shown above the gripping surface of the lower portion of the clamp base which assists in firm/stable connection of the clamp to the walls of fluid collection pans having different draft angles and upper pan configurations, and base plate notches having vertical alignment rearward from the vertically-extending lower portion of the base plate (and closer to the cap top, see FIG. 20, instead of vertical alignment with the gripping surface on the vertically-extending lower portion of the base plate used in the first preferred embodiment of clamp structure, see FIG. 3).

FIG. 19 also shows the float housing and the bottom portion of the clamp base positioned within the fluid collection pan, opposed pivot pins integral to the top portion of the clamp arm each pivotally engaged with a different notch in the top edge of the clamp base, the interior bottom portion of the clamp arm engaging the exterior surface of the pan wall, and the hand-manipulated nut (or knob) positioned outside the pan wall perimeter where it can be easily accessed and used during float housing installation onto a pan wall for monitoring the depth of liquid accumulation in the pan, the nut/knob also used to release the clamp and float housing from their established pan wall positioning, and/or used for partially loosening (and then retightening) the grip of the lower portion of the clamp arm against the exterior pan wall so that a change in float housing elevation can take place relative to the pan wall and the pan's interior bottom surface (as desired or needed for optimal invention performance during liquid depth monitoring) without removal/replacement of the clamp from its installed position of use on the pan wall.

FIG. 20 also shows the clamp arm and clamp base each securely engaging a different one of the opposing surfaces of a vertically-extending wall of a fluid collection pan through use of one tightened hand-manipulated nut (or knob) and one externally-threaded fastener that together fix the associated float housing in a stable position (with its bottom surface very close to the bottom interior surface of the fluid collection pan) prior to and during liquid accumulation in the supporting pan. FIG. 20 further shows the float housing having a vertically-extending open channel through which the free end projection of the float frame extends beyond the float housing exterior for use in testing the proper function of the present invention switch in its established position of use, as well as for manual reset of the float assembly when needed to restore electrical power to an associated fluid-producing system after TRIPPED state positioning of the two magnets occurred to discontinue fluid production.

FIG. 21 further shows a vertically-extending keyway extending into the 3-sided upper extension (the associated lower portion of the keyway identified in FIG. 22 through the connective structure marked with the number 15'), and the keyway having a width dimension only sized for insertion therethrough of a fastener body, but not its fastener head (which remains within the protective channel closely surrounding it at all times). Movement of the keyway vertically relative to the key on the stationary clamp base, in combination with the guide rails also on the clamp base, together provide smooth and reliable elevation adjustment of the float housing relative to the clamp base and also relative to the interior bottom surface of the supporting fluid collection pan.

FIG. 22 also shows a vertical section line marked as A-A superimposed thereon and extending through the rigid connective structure integral only to the exterior surface of the float housing. The right illustration of FIG. 22 in the section view marked as SECTION A-A is directed toward the clamp base, and shows the present invention clamp base, a small portion of the anti-rotational and fastener-stabilizing connective structure integral to the float housing exterior, and the key-to-keyway connection between the clamp base and the float housing's connective structure that permits vertical elevation adjustment of the float housing relative to the supporting wall of a fluid collection pan without needing to remove the clamp arm or clamp base from its installed position of use on the fluid collection pan wall. In addition, FIG. 22 shows a rectangular fastener head situated above the key (the fastener head obscuring the attached externally-threaded fastener body extending away from the viewer behind it). In contrast, the key positioned below the fastener head extends toward the viewer through the vertically-extending keyway. A small void space (not discernable in FIG. 22) adjacent to the portion of the 3-sided upper extension facing the cap top provides a protective channel closely surrounding the fastener head and stabilizing it during movement of the float housing and keyway in the 3-sided upper extension when the float housing and keyway are raised or lowered together relative to the clamp arm, clamp base, and fastener head in the preferred range of approximately 1.5 inches for HVAC applications (but not limited thereto in all contemplated invention applications).

COMPONENT LIST

Figure 1:
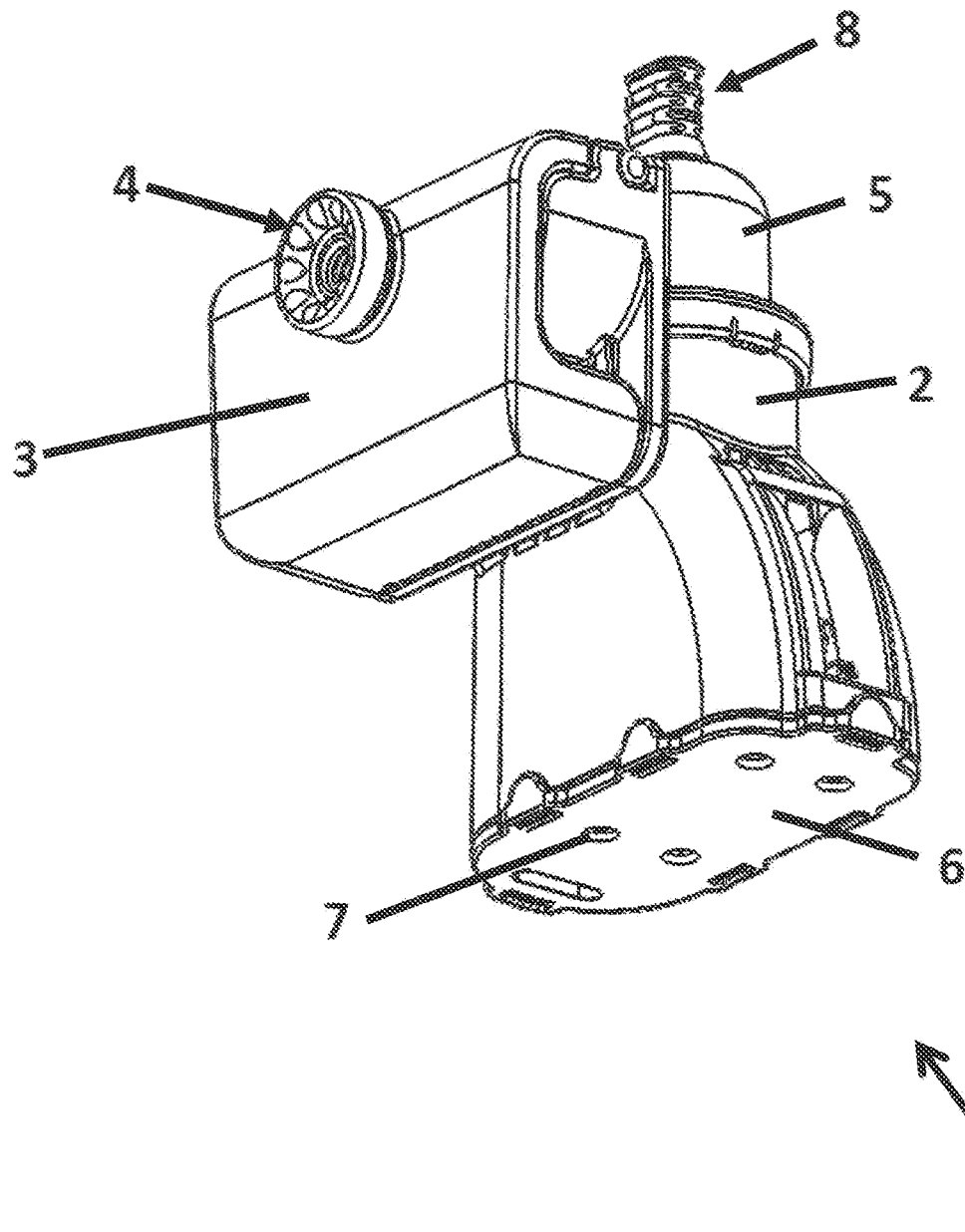
FIG. 1 is a perspective view from the bottom and mounting clamp side of a first preferred embodiment of the present invention latching magnetic float switch and clamp combination showing at least one fluid passage opening through the base plate under its sturdy float assembly, the base plate preferably secured to the bottom end of the float housing to substantially enclose it with at least one snap-fit tab, and the top end of the float housing supporting a cap top with a wiring harness extending upwardly therefrom for connection into the electrical circuit of a fluid-producing system (not shown).
Figure 2:
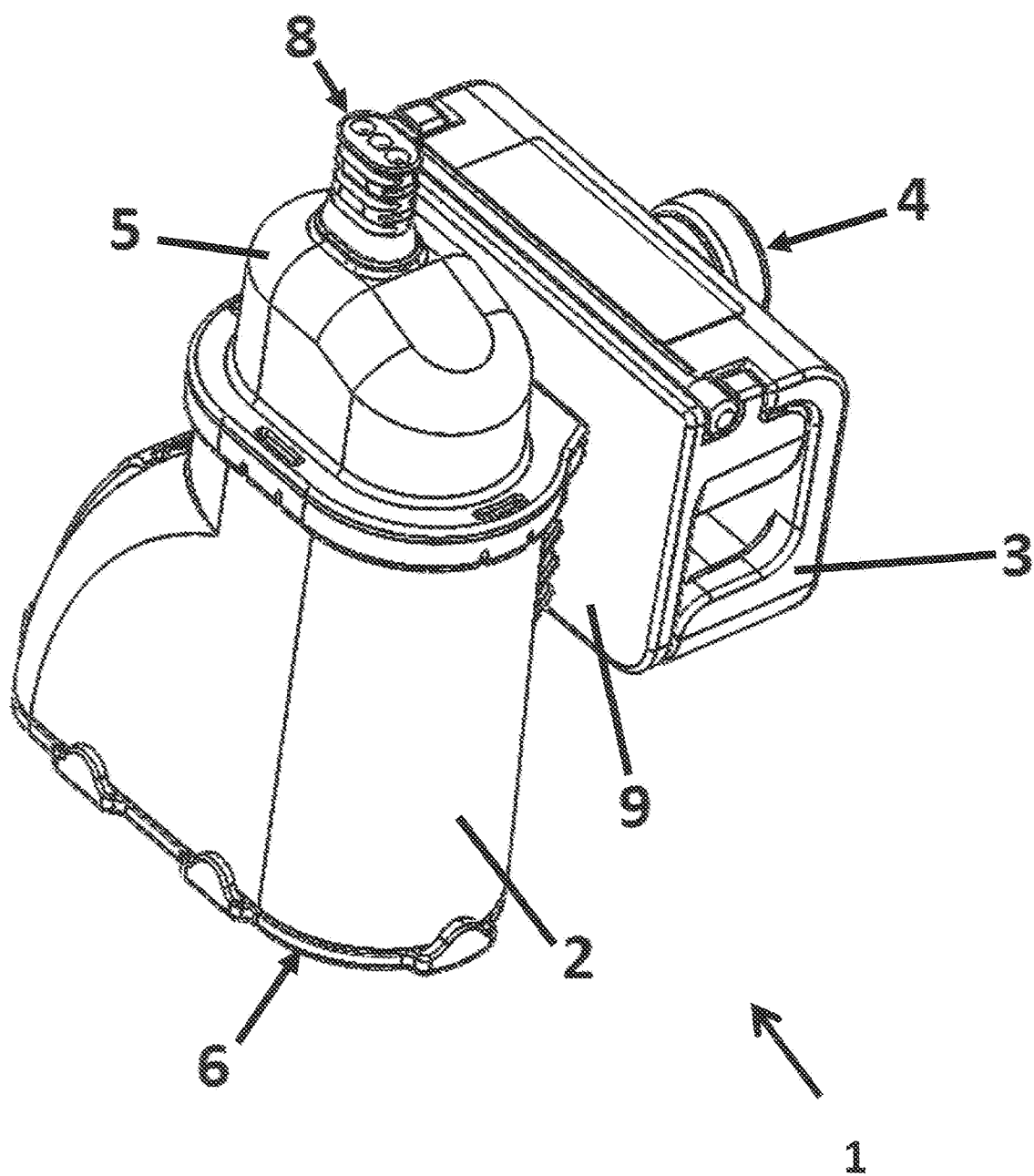
FIG. 2 is a perspective view from the top and float housing side of the invention in FIG. 1, showing more of the clamp base to which the pivotably rotatable C-shaped clamp arm is attached via an integral pivot pin (each end of which engages a different one of the opposed notches formed in the clamp base top edge).

1—latching magnetic float switch (comprises float housing 2, cap top 5 or other top enclosure for the upper end of float housing 2 that protects the electrical circuit interrupting components supported by the terminal block, plate base 6 (or equivalent) with at least one fluid passage opening 7, wiring harness 8, and a clamp 39' (or other clamping means with or without elevation adjustment capability that can stabilize the positioning of float housing 2 on the wall of a metal or plastic fluid collection pan, such as pan 40, during use at multiple elevations relative to the bottom interior surface of the supporting pan)

2—float housing (preferably cap top 5, float housing 2, and base-plate 6 together provide a substantially enclosed interior space protecting float assembly 29, toggle bar 31, two sets of paired electrical contacts 22, and magnets 34/35 from outside obstruction and interference during their use. Molded connective structure (having no separate numerical designation in the accompanying illustrations unless performing a fastener-stabilizing function) is located between clamp base 9 or 9' and float housing 2, and typically (but not always exclusively) integral to the exterior surface of float housing 2, see FIGS. 3-4 and FIGS. 20-22. FIGS. 1-8 show a first preferred embodiment of clamp arm 3 and clamp base 9 contemplated as a part of the present invention for secure support of float housing 2 in its selected and secure/fixed position of use over and against the pan wall of a fluid collection pan (40 or other) without any elevation adjustment capability relative to the pan wall. In contrast, FIGS. 17-22 show a second preferred embodiment of clamp arm 3' and clamp base 9' (collectively referred to as clamp 39') contemplated as a part of the present invention for support of float housing 2 in its selected and secure/fixed position of use over and against the supporting wall of a fluid collection pan (40 or other), while also providing elevation adjustment capability relative to the pan wall. Elevation adjustment of float housing 2 is conducted while clamp 39' remains in its installed location, saving time and providing user convenience. As viewed in FIG. 21, the height-adjusting connective structure associated clamp 39' has a 3-sided upper extension providing a protective channel that closely surrounds the flattened/rectangular fastener head 17' (to prevent rotation of its connected fastener body 16') while in its position of use between clamp base 9' and cap top 5. After knob/nut 4' is slightly loosened from fastener 16', float housing 2 and the connected 3-sided upper extension are easily moved together vertically up or down relative to the key 42 on clamp base 9' relative to the top and bottom ends of a vertically-extending keyway 41 formed in part of the connective structure 15'. During the elevation adjustment of float housing 2, fastener 16', fastener head 17', clamp arm 3', and clamp base 9 maintain their original/fixed elevation relative to the supporting fluid collection pan wall (40 or other). After elevation adjustment of float housing 2 is complete, the protective channel prevents rotation of fastener head 17' when nut/knob 4' is again tightened against the distal end of fastener 16' to prevent further elevation adjustment of float housing 2. In addition, the connective structure with its 3-sided upper extension further distributes forces that float housing 2 encounters during use to better stabilize and maintain it in its installed position relative to its supporting pan wall (40 or other). For comparison and contrast, the fastener head 17 in the first preferred embodiment of latching magnetic float switch 1 has positioning within a hollow receptacle 15 that is located between clamp arm 3 and clamp base 9, is prevented from rotation by fastener-head-stabilizing hollow receptacle 15, and the connective structure between the exterior surface of float housing 2 and clamp base 9 and float housing 2 is integral to both (preventing elevation adjustment of float housing 2 relative to its supporting fluid collection pan).

3—pivoting curved/bowed clamp arm of the first preferred embodiment of clamp (preferably C-shaped and having integral pivot pin 12 on its top edge with opposed ends that each engage a different one of the receiving notches 13 in the top edge of clamp base 9, allowing clamp arm 3 to pivot upwardly relative to clamp base 9 for its release from engagement with clamp base 9 only after clamp arm 3 reaches its fully-rotated positioning. The curved/bowed clamp arm 3 shape allows use of the present invention clamp on plastic or metal pans with different upper wall shapes and draft angles.)

3'—pivoting curved/bowed clamp arm of the second preferred embodiment of clamp (identified by the number 39' and shown in FIGS. 17-20) Preferably has split pivot pin 12' on its top edge with opposed pivot-pin-like ends that each engage a different one of the opposed receiving notches 13' in the top edge of clamp base 9', allowing clamp arm 3' to pivot upwardly relative to clamp base 9' for upward release of clamp arm 3' from engagement with clamp base 9' only when clamp arm 3' reaches its fully-rotated positioning. The curved/bowed clamp arm 3' appears to have a more J-shaped configuration than a C-shaped one and is usable with both metal and plastic fluid collection pans, 40 or other, with differing upper wall shapes and draft angles.

4 and 4'—hand-manipulated nuts (or knobs) respectively used with the first and second preferred embodiments of clamp arms 3 and 3' for threaded connection with preferred embodiments of an externally-threaded fastener 16 or 16', which when tightened together against one another respectively hold curved/bowed clamp arm 3 to clamp base 9 and curved/bowed clamp arm 3' to clamp base 9' in fixed positions against the opposed surfaces of a fluid collection pan wall (40 or other). Each nut or knob 4 or 4' comprises an internally threaded extension sized to pass through the opening 11 or 11' centrally located in the upper portions of clamp arm 3 or 3'.

5—cap top (it preferably encloses the top end of float housing 2 and supports wiring harness 8. A separate cap top assists present invention manufacture, although alternative means of enclosing the top end of float housing 2 and providing support for wiring harness 8 could be substituted.)

6—base plate of float assembly 29 with at least one fluid passage opening 7 therethrough (it encloses the bottom end of float housing 2 and preferably has at least one snap-fit tab 30)

7—fluid passage opening through base plate 6

8—wiring harness providing selectively interrupted electrical communication between the two sets of paired electrical contacts 22 in float housing 2 and a fluid-producing system, appliance, and/or controller regulating fluid production (not shown), and/or also activating an alarm or initiating at least one notification when excess liquid accumulation is detected beyond a depth predetermined to create a risk of harm to the system, appliance, controller, and/or its surroundings. The interruption of electrical power in the circuit to which wiring harness 8 is connected shuts off electrical power to the associated system, appliance, or controller, preventing additional fluid production until manual reset of float assembly 29 recreates and maintains the RUN state where fluid production can continue until excess liquid depth is again detected in the fluid collection pan supporting the present invention float housing 2 and magnets 34 and 35 and interrupted electrical communication through wiring harness 8 is then repeated.

9—clamp base in the first preferred embodiment of clamp that in combination with clamp arm 3, one fastener 16, and one nut/knob 4 can provide secure and fixed installed positioning of float housing 2 relative to the wall of a fluid collection pan (such as the pan 40 shown in FIGS. 19 and 20 in broken lines) for detection of liquid accumulation within the associated fluid collection pan in excess of a depth predetermined to have an increased risk for damage to the associated fluid-producing system, appliance, controller, and/or its surroundings. Clamp base 9 is securely fixed to the exterior of float housing 2 via rigid connective structure (which becomes integral to both components and prevents independent movement of float housing 2 relative to clamp base 9, or separation therefrom). During use of clamp base 9, a clamp arm 3 is pivotally connected to clamp base 9 at their respective top edges. Nut/knob 4 engages the distal end of fastener 16 to tighten clamp arm 3 against clamp base 9 so that each becomes securely fixed over and against a different one of the opposing and vertically-extending surfaces of a fluid collection pan wall (and clamp arm 3 located against the pan wall's exterior surface). Clamp base 9 comprises a vertically-extending surface with opposed horizontally-extending top and bottom edges, the upper portion of the vertically-extending surface supporting a centrally-located hollow receptacle 15 that is sized/shaped to closely surround the head 17 of fastener 16 and then maintain fastener head 17 in a fixed position to prevent rotation of the connected externally-threaded body of fastener 16 as nut/knob 4 and its extension progressively engage the distal end of fastener 16 for securely tightening clamp arm 3 against clamp base 9, as well as use during counter rotation and release of nut/knob/ 4 from fastener 16 when needed for clamp arm 3 to reach a fully-pivoted upward positioning that allows release of its integral pivot pin 12 from the two opposed notches 13 in the top edge of clamp base 9. Furthermore, since hollow receptacle 15 is located between clamp base 9 and clamp arm 3, clamp base 9 has no fastener opening or hole 11 (as is present and needed in the second preferred embodiment of clamp base 9' for elevation adjustment of float housing 2). The lower portion of the vertically-extending surface of clamp base 9 has non-slip/gripping structure providing secure non-slip/gripping attachment to the wall of a fluid collection pan (40 or other), the upper and lower portions of clamp base 9 are also separated from one another by a wide clamp-strengthening U-shaped member extending horizontally outward from the vertically-extending surface of clamp base 9 and situated below hollow receptacle 15. The two opposed receiving notches 13 spaced apart on the top edge of clamp 9 are also aligned vertically with the non-slip/gripping structure (in contrast to the notches 13' which have preferred vertical alignment rearward from the vertically-extending lower portion of clamp base 9' to better accommodate moving structure during elevation adjustment of float housing 2).

Figure 19:
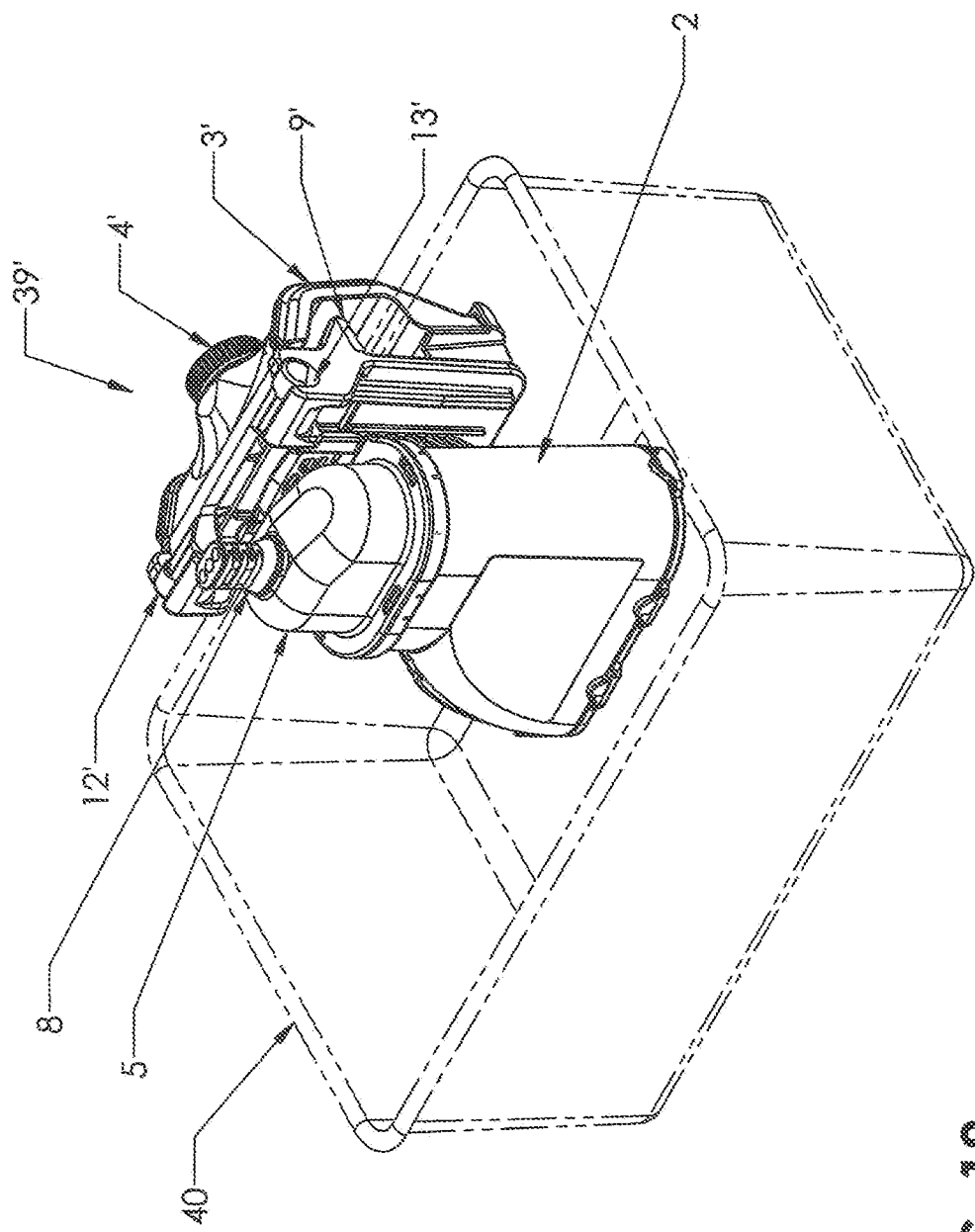
FIG. 19 is a perspective view from the top of the second preferred embodiment of clamp usable with a present invention float switch housing, the clamp base and J-shaped curved/bowed clamp arm together secured over and against opposing surfaces of a vertically-extending wall of a fluid collection pan through use of a single hand-manipulated nut (or knob) tightened against an externally-threaded fastener, with a part of its rectangular fastener head visible behind the right portion of the cap top supported by the float housing (and most of the externally-threaded body of the fastener situated between the upper portions of the clamp arm and clamp base).
Figure 20:
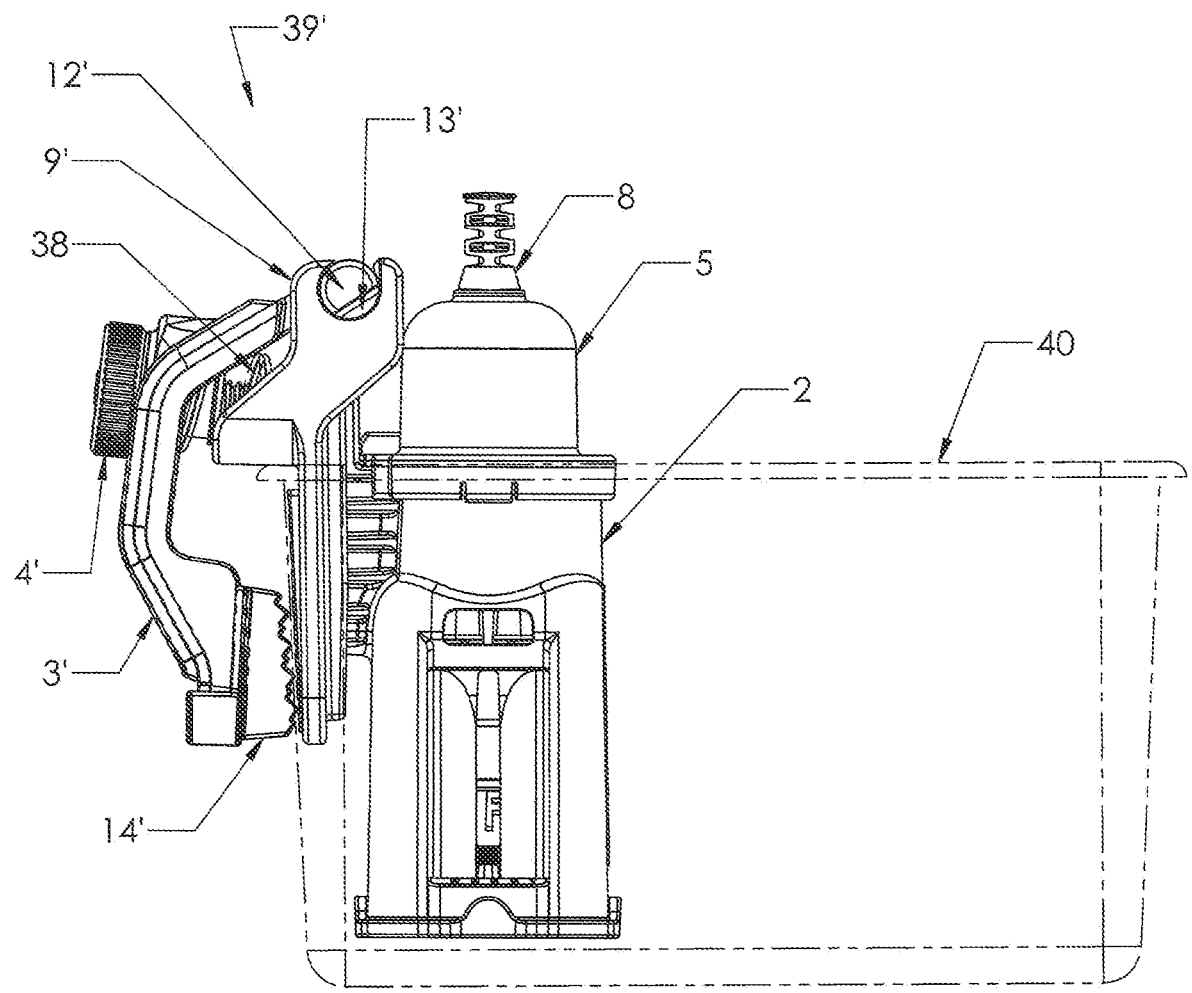
FIG. 20 is a side view of the second preferred embodiment of clamp securely connected to the float housing via rigid connective structure only integral to the float housing exterior and further shows the associated clamp base and curved/bowed clamp arm joined together at their upper ends by integral pivot pins each having a flattened side for easier upward release.

9' clamp base used in the second preferred embodiment of clamp 39' with rotatable clamp arm 3' to support float housing 2 in a fixed/installed position of use over and against the opposed surfaces of the vertically-extending wall of a fluid collection pan 40 (as shown in FIGS. 19 and 20 in broken lines). Clamp base 9' has some changed or added structural features different from clamp base 9 that in combination with other adaptations in clamp 39' allow vertical elevation adjustment of float housing 2 relative to clamp base 9', clamp arm 3', and the bottom interior surface of its supporting fluid collection pan wall (40 or other). One structural change is use of fastener head strengthening connective structure 15' integral only to float housing 2 which has a vertically-extending keyway 41 formed through it and lateral structure formed into a 3-sided upper extension that closely surrounds fastener head 17' for anti-rotational stabilization of it and its connected fastener body 16' during engagement and disengagement thereof with knob/nut 4'. Clamp base 9' also has a key 42 sized and configured for movement of the keyway 41 relative thereto during elevation adjustment of float housing 2. Key 42 and guide rails 43 on clamp base 9', fastener 16', and the connective structure 15' integral to float housing 2 all in combination facilitate elevation adjustment of float housing 2. Clamp base 9' also has an upper portion with a central hole/opening (not numbered, but positioned to be in threaded communication with hole/opening 11' in clamp arm 3' when clamp arm 3' and clamp base 9' are joined together with fastener 16'). The upper portion of clamp base 9' is separated from its lower non-slip/gripping portion 14' by a horizontally-extending wide U-shaped clamp-strengthening member having a central split to accommodate desired positioning of a fastener alignment spring 38 when fastener 16' is inserted through the aligned central holes/openings 11' of clamp arm 3' and clamp base 9'. Spring guides 44 around the hole/opening located immediately above the central split in clamp base 9' are sized and positioned to assist alignment of one end of fastener alignment spring 38 during tightening of clamp arm 3' and clamp base 9' together against opposing surfaces of the wall of a fluid collection pan 40 (or other). Prior to elevation change of float housing 2, nut/knob 4' must be slightly loosened from threaded fastener 16', and then immediately after elevation adjustment is complete, clamp base 9' and clamp arm 3' are again secured tightly together by tightening of nut/knob 4' against fastener 16' to prevent further elevation change in float housing 2. During connection of float housing to clamp base 9' and clamp arm 3' for installation on the wall of a fluid collection pan 40 (or other), the distal end of fastener 16' is first inserted through the keyway 41 in connective structure 15' (integral only to float housing 2). With the fastener head 17' connected to fastener 16' remaining between connective structure 15' and float housing 2 (or cap top 5), the distal end of fastener 16' extends through the fastener hole/opening in the upper portion of clamp base 9', and then through fastener alignment spring 38 until it engages the extension of knob/nut 4' that has been inserted at least partially through the fastener opening 11' in clamp arm 3'. Wherever knob/nut 4' is loosened from the distal end of fastener 16' (even slightly), fastener alignment spring 38 forces the lower gripping portions of clamp arm 3' and clamp base 9' sufficiently away from each other, to promote quick and easy elevation adjustment of float housing 2.

10—visual trip indicator window (provides easily visible notification to those observing it regarding the current status of float assembly 29 movement within float housing 2 between its elevated UP positioning in the TRIPPED actuator state and its lowered and offset DOWN positioning in the RUN state that allows electrical current to reach the associated fluid-producing system via a closed electrical circuit that also includes wiring harness 8 and the two sets of paired electrical contacts 22 each supported in part by the pivoting toggle bar 31. Such current status notification may be optionally color coded with green representing the RUN state and red representing the TRIPPED state, but is not limited thereto)

11—hole/opening through clamp arm 3 (sized to allow insertion therethrough of the internally-threaded extension of nut/knob 4 for engagement with the distal end of externally-threaded fastener body 16 to provide stable mounting of float housing 2 onto the wall of a fluid collection pan 40, or other pan, for monitoring the depth of liquid accumulation in the pan in excess of a predetermined amount indicating a risk of damage to the fluid-producing system or its surroundings)

11'—hole/opening through clamp arm 3' and clamp base 9' (sized to respectively allow insertion of the internally-threaded extension of nut/knob 4' therethrough for engagement with the distal end of fastener 16' to achieve stable mounting of float housing 2 onto the wall of a fluid collection pan 40 (or other) during its liquid depth monitoring use. Configurations may vary and include a keyhole shape opening in clamp arm 3' where needed to assist the alignment and connection of nut/knob 4' and its extension, as well as fastener alignment spring 38, over the distal end of the externally-threaded fastener 16' prior to their use together in tightening clamp arm 3' and clamp base 9' together to mount float housing 2 in a fixed and stable position relative to a wall of fluid collection or drain pan 40, or other)

12—integral pivot pin (situated on the top edge of clamp arm 3 with its opposed ends each engaging a different one of the two opposed receiving notches 13 in the top edge of clamp base 9, each of its opposed ends having a preferred circular cross-section)

12'—split pivot pin (situated on the top edge of clamp arm 3' and configured to accommodate vertical movement therethrough of the strengthening and anti-rotational connective structure 15' integral to float housing 2, and its 3-sided extension when present, that also facilitates float housing 2 elevation adjustment relative to the interior bottom surface of a fluid collection pan 40, or other fluid collection pans with draft angles and upper wall configurations differing from that shown in the accompanying illustrations in FIGS. 19 and 20 for pan 40, split pivot pin 12' further having two pivot-pin-like ends each with a preferred partially-flattened circular cross-section allowing engagement with a different one of the opposed receiving notches 13' formed into the top surface/edge of clamp base 9' and easy release when clamp arm 3' is in its fully-rotated position relative to clamp base 9')

13 and 13'—receiving notches in clamp base 9 and 9' respectively engaging the opposing pivot-pin-like ends of integral pivot pin 12 and split pivot pins 12' for rotational movement of clamp arms 3 and 3' relative to clamp base 9 or 9'. Vertical alignment of notches 13 and 13' are different, with those for clamp base 9 aligned vertically with the non-slip/gripping structure (in contrast to the notches 13' which have preferred vertical alignment rearward from the vertically-extending lower portion of clamp base 9' to better accommodate moving structure during elevation adjustment of float housing 2.

14 and 14'—non-slip/textured/gripping surface on the lower portions of clamp base 9 or 9' and clamp arm 3 or 3' (may comprise ridges, over-mold, and/or other added/gripping/resilient material)

15—fastener-stabilizing hollow receptacle in the first embodiment of clamp base 9 that outwardly extends in perpendicular orientation to clamp base 9 and prevents the head 17 of fastener 16 from rotation when nut/knob 4 is hand-manipulated to progressively engage the distal end of fastener 16 for securely fixing and stabilizing clamp arm 3 to clamp base 9 over and against the opposing surfaces of a wall of a fluid collection pan (40, or other), thereby placing/maintaining a float housing 2 (having fixed association with clamp base 9) into its desired position for monitoring the depth of accumulated liquid depth in the supporting pan

15'—fastener-stabilizing connective structure used in the second preferred embodiment of clamp 39' and integral to float housing 2 that prevents the head 17' of fastener 16' from rotating while nut/knob 4' and its extension are hand-manipulated to progressively engage the distal end of fastener 16' for securely fixing curved/bowed clamp arm 3' to clamp base 9' over and against the opposing exterior/interior surfaces of a fluid collection pan wall (40 or other). The lower part of fastener stabilizing connective structure 15' is configured to move vertically within the spaced-apart guide rails 43 on clamp base 9' and the upper part thereof may be configured in the shape of a 3-sided upper extension adapted to create a generally trapezoid-shaped protective channel between itself and adjacent surfaces of cap top 5 and float housing 2 that contains, stabilizes, and protects the fastener head 17' during elevation adjustment of float housing 2 relative to the wall and interior bottom surface of a supporting fluid collection pan 40, the 3-sided upper extension also having a configuration angled and sized to avoid contact with the top edges of the split pivot pin 12' of clamp arm 3', the split pivot pin 12' allowing fastener stabilizing connective structure 15' to smoothly move up and down relative to clamp base 9' for any elevation adjustment of float housing 2 relative to pan 40 needed for optimum fluid depth detection use and/or as close as is possible to the interior bottom surface of pan 40 (or other fluid collection/drain pan) to avoid a risk of damage to the associated fluid-producing system and its surroundings. Stabilizing connective structure 15' also disperses forces that could otherwise cause unstable positioning of float housing 2 and unfavorable displacement thereof from its originally installed orientation and/or preferred position of use that could cause or contribute to pan wall lean-in.

16 and 16'—externally-threaded fastener (used with nut/knob 4 or 4' to secure clamp arm 3 or 3' and clamp base 9 or 9' together and into secure/fixed positioning over and against the opposing walls of a fluid collection pan, 40 or other. Prior to fastener 16 and 16' use, a pivoting connection must be established between the upper edges of clamp arm 3 or 3' and clamp base 9 or 9'. After fixed positioning over and against a pan wall is achieved, clamp arm 3 or 3' will engage the exterior surface of the supporting fluid collection pan wall, with clamp base 9 or 9' engaging the interior surface of the supporting fluid collection pan wall, placing float housing 2 within the pan's interior volume/space for liquid accumulation monitoring activity and selective shut off of the fluid-producing system in fluid communication with the supporting pan when liquid depth in the pan exceeds a predetermined amount considered to place the system and/or its surroundings at risk for damage.)

17—head of externally-threaded fastener 16 (steadies the externally-threaded body of fastener 16 during its engagement with nut/knob 4. It can be rectangular, hexagonal, octagonal, or any other shape that prevents rotation of fastener 16 while head 17 is closely held by fastener-stabilizing hollow receptacle 15 and nut/knob 4 is progressively tightened against the distal end of the externally-threaded fastener 16.)

17'—head of externally-threaded fastener 16' (steadies the externally-threaded body of fastener 16' during its engagement with nut/knob 4'. It preferably has a flattened rectangular configuration but is not limited thereto, with positioning between float housing 2 and the connective structure integral to it and into which keyway 41 is found. The size and shape of fastener head 17' must be selected to fit within the protective channel formed by the 3-sided upper extension of the connective structure 15' to avoid interference with any float housing 2 elevation adjustment activity)

18—vertically-extending open channel in float housing 2 that allows movement outside float housing 2 of the unattached free end projection of the float frame 28 which is raised magnetically and then lowered manually as a part of float assembly 29 during its movement between TRIPPED and RUN state positioning. The free end projection 28 serves multiple purposes, as follows. The current upwardly or downwardly elevated positioning visible for free end projection 28 in open channel 18 itself is an indicator of the current RUN or TRIPPED state of float switch 1. In addition, the free end projection of float frame 28 extending through open channel 18 is also used for in situ testing of proper switch 1 operation at any time by manual manipulation upward to see if fluid production stops. Also, after TRIPPED state actuator positioning of float magnet 35 is reached and once issues leading to excess liquid accumulation in the supporting fluid collection pan have been identified and resolved, it is free end projection 28 that is used to manually reset float assembly 29 to its original lowered RUN state positioning where float magnet 35 is again offset from the toggle bar magnet 34 to create a large gap between them that lessens their magnetic attraction to one another, which then allows toggle bar magnet 34 to seek and return to its raised and upwardly-biased RUN state positioning where electrical power to an associated fluid-producing system is restored for its resumed operation.

Figure 6:
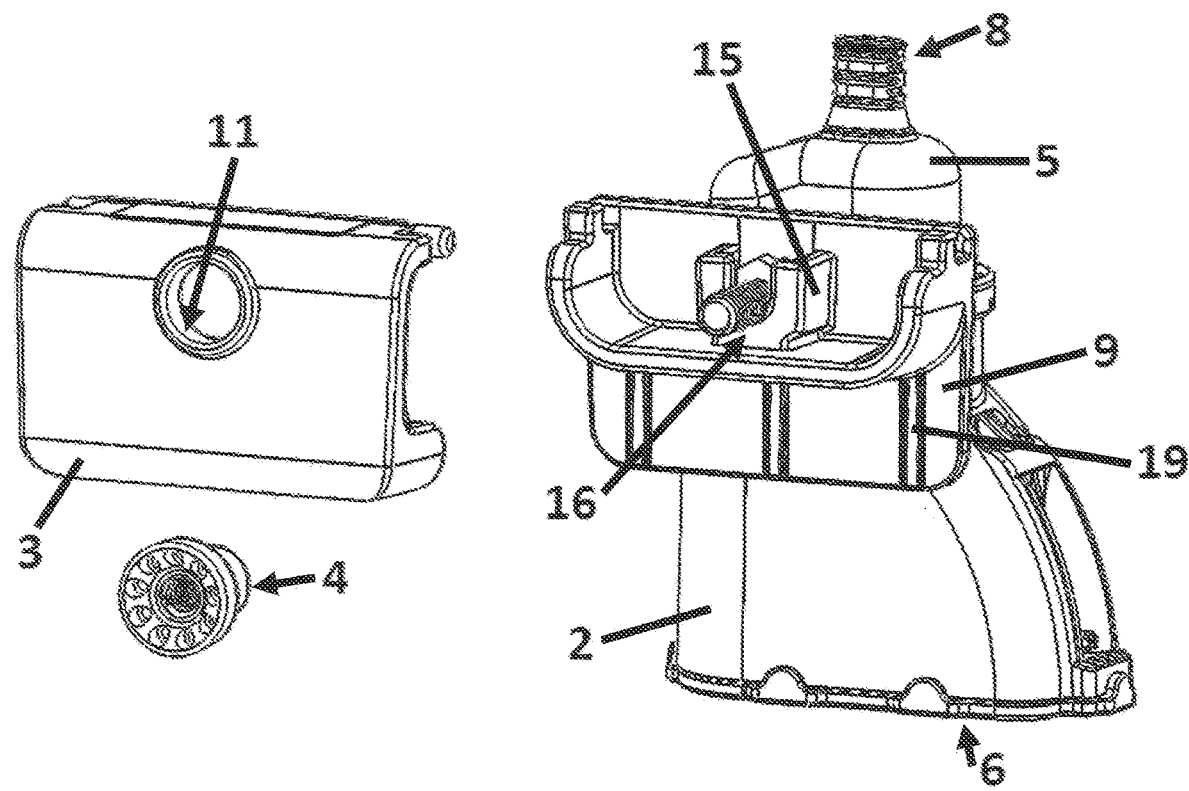
FIG. 6 is a view of the invention in FIGS. 1-5 from its clamp side that shows the curved/bowed and generally C-shaped clamp arm of the first preferred embodiment of mounting clamp separated from the clamp base and the internally-threaded nut/knob separated from the externally-threaded fastener. The head of the fastener remains in a small hollow receptacle extending outwardly from the upper portion of the vertically-extending interior surface of the clamp base. The fastener head is only removable from the hollow receptacle by sliding it in an upwardly direction out of the receptacle once the clamp arm has been rotated into a fully-rotated and vertically-extending position, and then lifting it upwardly away from the clamp base. The hollow receptacle also closely surrounds the fastener head, preventing rotation of both fastener head and body as the nut/knob and its extension progressively engage the distal end of the fastener to tighten the clamp arm and clamp base together, securing them over and against the opposing surfaces of the wall of a fluid collection pan.

19—strengthening ribs on clamp base 9 (See FIG. 6. They help float housing 2 to maintain steady positioning relative to the wall of a supporting fluid collection pan during use.)

20—gap between clamp arm 3 and clamp base 9 (allows a firm engagement of clamp arm 3 against the exterior wall surface of either a metal or plastic fluid collection pan, irrespective of its upper wall configuration or draft angle that facilitates vertical stacking and storage of fluid collection pans prior to use)

21—biasing pull piece (may consist of, but is not limited to, a ferrous pin, screw or other metal or substance with magnetic properties capable of upwardly biasing toggle bar magnet 34 away from float magnet 35 to maintain RUN state positioning. It may be used alone, in combination with other biasing structure maintaining a RUN state for the toggle bar magnet 34, or be replaced by other biasing means suitable to a needed fluid shut off application)

22—paired electrical contacts (two sets are preferred with one contact in each set supported by a different pivoting end of toggle bar 31, a first set of paired electrical contacts alternatively opening and closing electrical communication through electrical wiring harness 8, with the pivoting movement of toggle bar 31 closing the first set of paired electrical contacts to allow electrical communication through wiring harness 8 when the second set of electrical contacts on the opposed end of toggle bar 31 become separated from one another. Interruption of electrical communication through wiring harness 8 occurs when the first set of electrical contacts become separated from one another as opposing end of toggle bar 31 pivots in the other direction. As that pivoting occurs, the second set of paired electrical contacts then close and may activate a light or provide other/remote notification that fluid production has been shut off)

23—upwardly biasing contact spring (at least one is preferably connected to the bottom surface of toggle 31 to provide upward biasing of toggle bar magnet 34 that helps to maintain the RUN state)

24—terminal block (supports toggle bar 31 and other components affecting the movement of toggle bar magnet 34 to selectively provide electrical current to an associated fluid-providing system)

25—upper float member (part of float assembly 29 providing buoyancy and support of float magnet 35)

26—float sticker (attached to upper float member 25 in a position that makes it selectively visible through trip indicator window 10, and as a part of float assembly 29 it becomes raised and lowered concurrently with float magnet 35, providing a fast visual (and optionally color-enhanced) reference as to the current RUN or TRIPPED state actuator positioning of float assembly 29 to observers looking through trip indicator window 10)

27—float pivot (integral to one end of the interior surface of base plate 6 and used to engage the non-elevating end of float frame 28 during pivotal movement of float assembly 29 from its lowered RUN state positioning to its raised TRIPPED state actuator positioning, and also during manual reset of float assembly 29 from its raised/TRIPPED state actuator position to its offset lowered/RUN state position)

28—float frame (the part of float assembly 29 having an elongated configuration that provides support for upper float member 25 and float magnet 35 during their respective pivotal movement from RUN state positioning to TRIPPED state actuator positioning, one end of float frame 28 is anchored to float pivot 27 and does not elevate while its opposing free end has a projection 28 that extends outside float housing 2 through open channel 18. The free end projection 28 moves upward in open channel 18 when float assembly 29 moves from its lowered RUN state positioning to its elevated TRIPPED state actuator positioning. Reverse movement of float assembly 29 and free end projection 28 from the elevated TRIPPED state actuator positioning to their lowered RUN positioning occurs only via manually-manipulated reset of free end projection 28 in a downwardly direction to the fully lowered and original RUN state position.)

29—float assembly (comprises upper float member 25, float frame 28, float sticker 26, float pivot 27, pillar support 36, and lower float support 37, and is positioned above base plate 6 with at least one fluid passage opening 7 therein and at least one snap fit tab 30 providing connection between base plate 6 and the open lower end of float housing 2)

30—snap fit tab (at least one may be provided for secure connection of base plate 6 over and against the open bottom end of float housing 2)

31—toggle bar (has opposed ends that are each pivotally movable between raised and lowered positioning such that as one end becomes raised, the opposed end is lowered, each end supports one contact from a different one of the two sets of paired electrical contacts 22, one end of toggle bar 31 also supports toggle bar magnet 34, and upward biasing is also preferably used to maintain toggle bar magnet 34 in its elevated RUN state positioning until float assembly 29 and float magnet 35 reach the elevated TRIPPED state actuator position that is predetermined to overcome all upward biasing and cause downward movement of toggle bar magnet 34 toward its lowered TRIPPED state position where strong snap-locked relation with float magnet 35 occurs until reset of float magnet 35 to its lowered RUN positioning is achieved manually)

32—magnet housing (may be associated with toggle bar 31 as a preferred means for securing and maintaining upper/toggle bar magnet 34 in its fixed position of use)

33—retainer pin (separates and supports fixed positioning of one contact in each set of paired electrical contacts 22 relative to its paired contact secured to one of the opposing ends of toggle bar 31)

34—toggle bar magnet (fixed in location on one end of toggle bar 31 preferably by magnet housing 32 in the most preferred embodiments of the present invention)

35—float magnet (has fixed association with upper float member 25 in a position and elevation that allows creation of a strong and rapid snap-locked magnetic latching of float magnet 35 to toggle bar magnet 34 in their respective TRIPPED state positions)

36—pillar support (part of float assembly 29 preferably holding float magnet 35 in fixed positioning relative to upper float member 25 during extended fluid depth monitoring use of the present invention)

37—lower float support (part of float assembly 29 that helps to give pillar support 36 fixed positioning during movement of float magnet 35 to and from its elevated TRIPPED state actuator positioning and its lowered offset RUN state positioning)

38—fastener alignment spring (part of the second preferred embodiment of clamp identified by the number 39' that is used with externally-threaded fastener 16' and facilitates alignment and secure installation of clamp arm 3' and clamp base 9' over and against the wall of a supporting fluid collection pan (40 or other), fastener alignment spring 38 also providing a slight sustained separation between clamp arm 3' and clamp base 9' when fastener 16' is slightly loosened from knob/nut 4' to allow elevation adjustment of float housing 2 relative to the interior bottom surface of a supporting fluid collection pan, 40 or other, without removing clamp 39' from its installed position of use, and once elevation adjustment of float housing 2 is finished, tightening of fastener 16' again secures fixed positioning of clamp arm 3' and clamp base 9' to the supporting fluid collection pan, 40 or other and prevents further elevation change for float housing 2)

39'—second preferred embodiment of clamp that can be used for elevation adjustment of float housing 2 and to stabilize it during monitoring of accumulated liquid depth in a supporting fluid collection pan (40 or other)

40—fluid collection pan supporting the present invention latching magnetic float switch 1 (may be made from metal, plastic, or other materials, and have a variety of upper wall configurations and draft angles, one example is shown in FIGS. 19 and 20 with broken lines for enhanced clarity regarding connection and positioning of clamp 39' over and against one of its vertically-extending walls)

Figure 22:
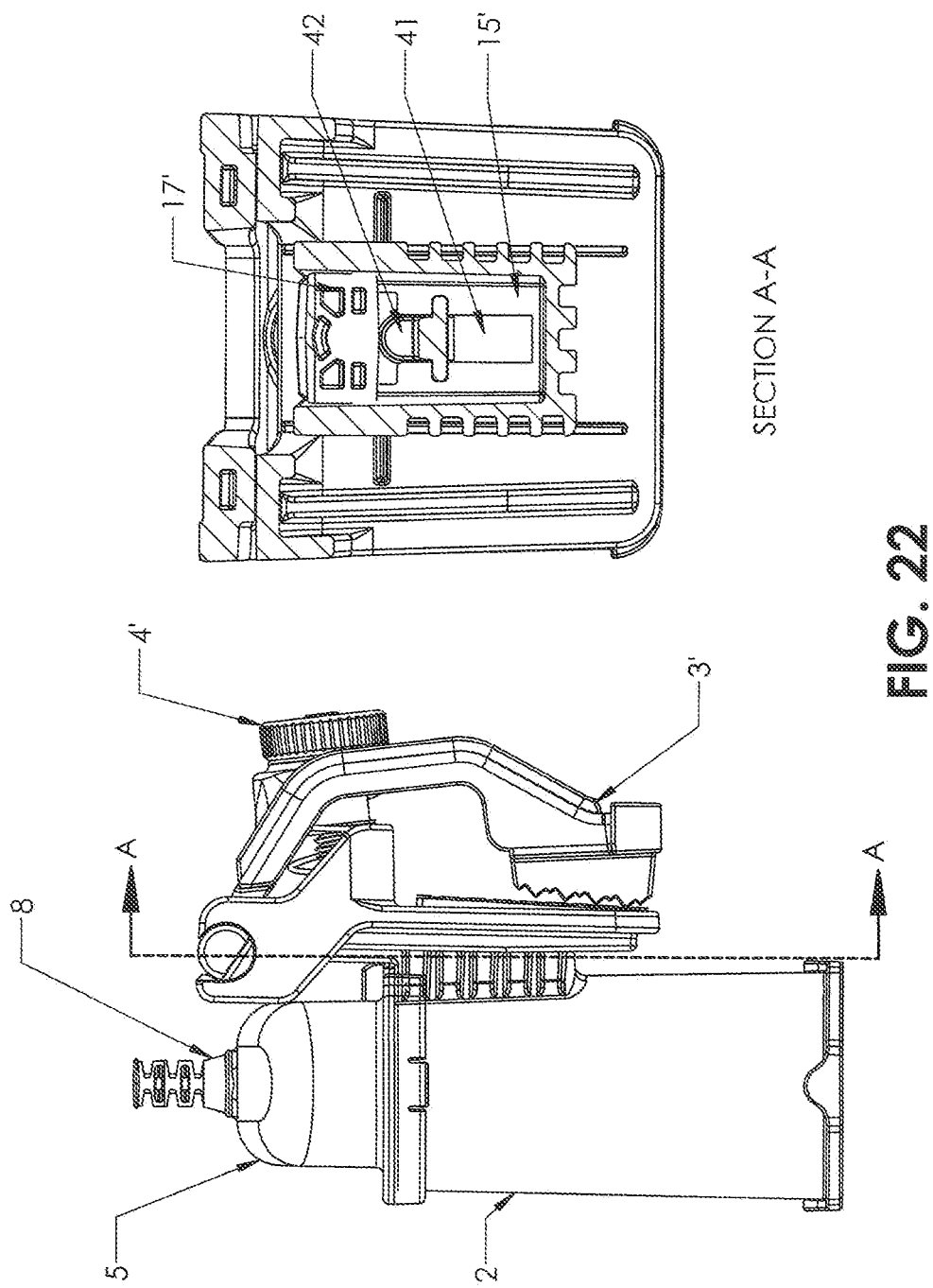
FIG. 22 contains two illustrations. The left illustration is a side view of the cap top, second preferred embodiment of clamp arm and clamp base, and the float housing attached with connective structure integral with its exterior, as shown in FIGS. 20 and 21.

41—vertically-extending keyway (positioned centrally through fastener-stabilizing structure 15' that assists elevation adjustment of float housing 2, see SECTION A-A in FIG. 22)

42—key on clamp base 9' (configured and sized for insertion into keyway 41 and vertical up and down movement of keyway 41 and float housing 2 relative to the key 42 that remains stationary and in fixed association with clamp base 9' that remains secured to a supporting fluid collection pan wall, 40 or other)

Figure 18:
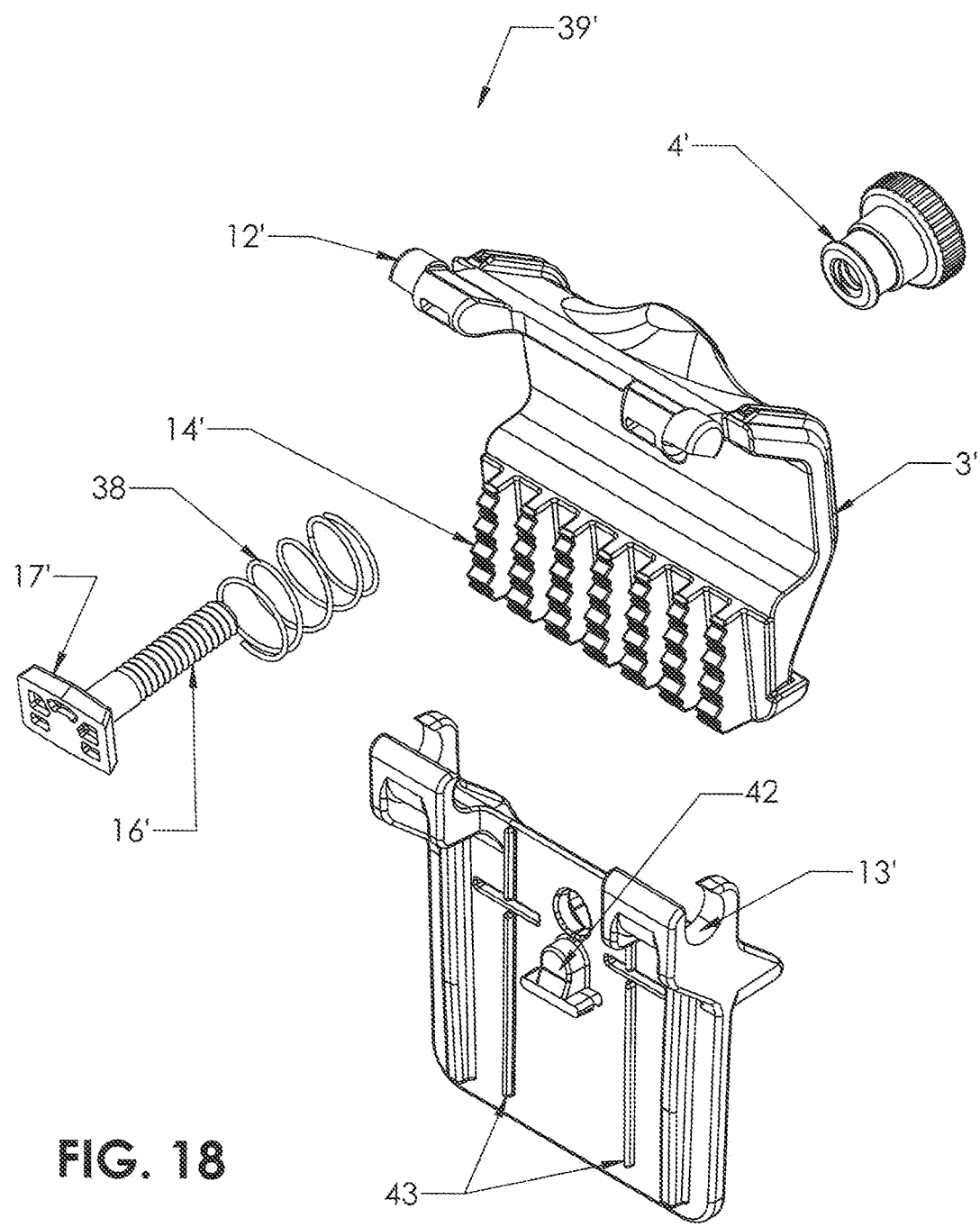
FIG. 18 is an exploded perspective view from the top of the second preferred embodiment of clamp shown in FIG. 17 with components now rotated approximately 90-degrees from the invention view provided in FIG. 17 to reveal surface structure not visible in FIG. 17, including the curved/bowed upper clamp arm surface facing a fluid collection pan wall during use, the most preferred non-slip/textured/gripping lower clamp arm structure configured for its firm/stable engagement with a pan wall, a key below the clamp base fastener hole, a vertically-extending guide rail on each side of the key that together define a track to contain and guide connective structure integral to the float housing during its up and down movement relative to clamp base 9' during elevation adjustment activity relating to float housing 2, the top edges of the clamp arm and clamp base each having a split configuration with an open center space respectively between the opposing pivot pins and opposed receiving notches, the pivot pins on the clamp arm top edge each having a flat edge, and the clamp base notches each configured and positioned for engaging a different one of the clamp arm pivot pins and not permitting separation of the clamp arm from the clamp base during pivoting rotation of the clamp arm unless the clamp arm is fully-rotated away from the clamp base.

43—guide rails (one positioned on each side of key on the surface of clamp base 9' facing float housing 2 and spaced apart from one another by a width dimension only slightly larger than the width dimension of connective structure 15' (integral to float housing 2) to provide a track to guide/contain connective structure 15' during its up and down movement relative to clamp base 9' during elevation adjustment activity relating to float housing 2 (see FIG. 18)

44—spring guide (preferably used adjacent to the fastener opening through clamp base 9 to help clamp spring 38 assume appropriate positioning for easier/faster tightening of clamp arm 3' to clamp base 9' together through use of fastener 16' and nut/knob 4')

DETAILED DESCRIPTION OF THE INVENTION

The most preferred embodiments of the present invention herein are latching magnetic float switches 1 with improved geometry and mechanics that provide: 1) stable installation of a float housing 2 containing electrical and magnetic components upon both metal and plastic fluid collection pans having different upper wall configurations and differing draft angles without pan lean-in at the installation site; 2) fast/easy switch 1 installation on a supporting fluid collection pan wall in seconds using a single fastener and hand-manipulated nut or knob; 3) rugged construction of float housing 2 and its connected 2-part clamp for reliable long-duration switch 1 use; 4) reliable system shut-off created by a strong/fast snap-locked engagement of opposed magnets initially offset from one another and/or under biasing influence that maintains the RUN position allowing fluid-producing system operation that multiply and enhance the magnetic snap-lock force beyond that capable between the two magnets alone; 5) system shut-off initiated by a very small amount of liquid entering the float housing; 6) easy/quick in situ testing of proper switch operation; and 7) easy in situ switch reset to restore electrical power to the fluid-producing system after testing or system shut-off when risk to the system or its surroundings was detected. The present invention also can provide in situ float housing 2 elevation adjustment allowing fluid-producing system shut-off when liquid accumulation depth in its supporting pan is as low as ⅜-inches. All preferred float housing 2 embodiments in the present invention have integral rigid connective structure as a part of their rugged construction. When in situ elevation adjustment of float housing 2 is not important to a fluid-monitoring application, the connective structure can also be integral to the clamp base 9 portion of the 2-part clamp, placing both float housing 2 and clamp base 9 in secure fixed association with one another for fluid depth monitoring use. In applications where fast/easy in situ elevation adjustment of float housing 2 is desired, preferred embodiments of the elevation-adjustable present invention include a key-to-keyway (42/41) assembly and a rigid connective structure 15' integral only to float housing 2, wherein it is the fastener 16' that provides a secure connection of float housing 2 to clamp base 9' in their installed positions of use. The assembly's vertically-extending keyway 41 is formed through the connective structure 15' integral to float housing 2 (see FIG. 22) and also extends into a 3-sided upper extension of connective structure 15' that remains separate from float housing 2 and cap top 5 (viewed in both FIGS. 21 and 22). The key 42 guiding movement of keyway 41 during elevation change to float housing 2 is attached to clamp base 9' in combination with vertical side rails 43 positioned on opposite sides of key 42. FIGS. 1-16 accompanying this invention disclosure show preferred structure in a first present invention embodiment without float housing elevation adjustment capability, while FIGS. 17-22 show preferred structure and configuration for a second present invention embodiment with the key-to-keyway (42/41) assembly allowing fast and easy elevation adjustment of float housing 2. Both embodiments have a clamp with curved/bowed configuration of clamp arm (3 or 3') which allows switch 1 use with a variety of plastic and metal fluid collection and/or secondary drain pans having different upper wall configurations and differing draft angles. Both embodiments of the present invention clamp are also secured during use by a single fastener 16 or 16' engaging a nut/knob 4 or 4' (after the top edges of clamp arm (3 or 3') and clamp base (9 or 9') are pivotally connected). Since installation of float housing 2 onto a pan wall requires secure connection of the float housing 2 to a clamp base, in the first preferred embodiment of the present invention without elevation adjustment capability for float housing 2, it is the rigid connective structure 15' integral to both clamp base 9 and the exterior of float housing 2 that joins float housing 2 and clamp base 9 securely together without any opportunity for separation. In contrast, the second preferred embodiment connective structure fulfills two purposes, that of creating a firm connection between float housing 2 and clamp base 9', and that of stabilizing fastener 16' against rotation during its engagement (and disengagement) with nut/knob 4 or 4'. Thus, the positioning of fastener heads 17 and 17' is different in the two preferred embodiments shown in the accompanying FIGS. 1-22. In the first preferred embodiment where no in situ elevation adjustment of float housing 2 occurs, its fastener 16 is stabilized against rotation by placement of fastener head 17 into a closely surrounding hollow receptacle 15 attached to the interior surface of clamp base 9 facing the interior surface of clamp arm 3 when the two are pivotally joined together. In the second preferred embodiment of the present invention, the hollow receptacle 15 is absent from clamp base 9' and replaced by a fastener opening/hole with the needed key 42 situated immediately below the hole. The fastener opening/hole in clamp base 9' becomes aligned the with fastener opening 11' in clamp arm 3' when clamp base 9' and clamp arm 3' are pivotally joined at their top edges, and also connects float housing 2 firmly to clamps base 9'. To make both connections (clamp arm 3' to clamp base 9' and float housing 2 to clamp base 9'), the externally-threaded fastener body 16' extends from the keyway 41, with its fastener head 17' remaining positioned within a shallow protective channel defined by a 3-sided upper extension of the connective structure 15' integral to float housing 2 and which remains movable with float housing 2 and during its elevation adjustment since it has no direct connection to float housing 2 or to cap top 5. The fastener body 16' then extends through the upper portions of the clamp arm 3' and clamp base 9', finally securing pivotal clamp arm 3' against clamp base 9' when firm threaded engagement is achieved between the distal end of fastener 16' and knob/nut 4' and its extension. Prior to vertical movement of float housing 2 for elevation adjustment purposes, nut/knob 4' and its extension engagement with fastener 16' must be slightly loosened (enough to allow manual up/down movement of float housing 2 but not enough loosening to permit clamp arm 3' and clamp base 9' to release their lower portion gripping engagement with the supporting pan wall, 40 or other). The clamp alignment spring 38 assists user creation of the small amount of loosening needed for this purpose. The 3-sided upper extension of connective structure 15' in its positioning where it closely surrounds fastener head 17', prevents rotation of fastener 16' during fastener-to-nut/knob engagement and disengagement. Once the desired float housing 2 elevation relative to the interior bottom surface of the supporting fluid collection pan 40 (or other) is reached, nut/knob 4' and its extension are fully tightened against fastener 16' to secure the installed positioning of clamp 39' onto the supporting pan wall (and also prevent further elevation adjustment of float housing 2). A wiring harness 8 connected on one end to paired electrical contacts 22 within float housing 2, and its second opposed end extending beyond the exterior of float housing 2 together selectively control the flow of electricity to a fluid-producing system in fluid communication with the fluid collection pan supporting float housing 2. Required manual reset of the present invention latching magnetic float switch 1 after system shut-off also addresses and overcomes other prior art problems related to intermittent tripping and short cycling that can lead to damage of the associated fluid-producing system and/or its surroundings. A rapid/strong snap-action system shut-off in present invention latching magnetic float switches 1 is also the result of a multiplication of other structure not present in the prior art, and the stronger magnetic attraction created thereby, and not simply the buoyancy of a lightweight float body 25, results in enhanced reliability over prior art fluid monitoring devices for a trouble-free and reproducible/strong snap-locking action between the two magnets (34 and 35) and reduced malfunction during long-term use. In the RUN state, the toggle bar magnet 34 of the most preferred embodiments of the present invention preferably has upward bias to maintain the operation of the fluid-producing system to which wiring harness 8 is electrically connected and which is also in fluid communication with the fluid collection pan (40, or other) supporting float housing 2. In the RUN state, the float magnet 35 positioning is offset from the toggle bar magnet 34 and a large gap exists between them, weakening their magnetic attraction to one another. To interrupt the RUN state and replace it with the TRIPPED state, successive actions take place with a change in positioning of the float magnet 35 first occurring, which becomes an actuator for a change in positioning of the toggle bar magnet 34 to occur. Liquid accumulation entering the bottom of float housing 2 through at least one opening 7 starts the change from RUN state to TRIPPED state where electrical power to the associated fluid-producing system in electrical communication with wiring harness 8 is shut off. When the depth of accumulated liquid under the float assembly 29 raises it the slight amount needed for magnetic attraction between the toggle bar magnet 34 and the float magnet 35 to start building and cause movement of the float magnet 35 closer to the toggle bar magnet 34, increasing magnetic attraction between the toggle and float magnets (34 and 35) to build exponentially and cause the float magnet 35 to reach its TRIPPED state actuator position (which has been calculated and predetermined to provide sufficient magnetic attraction between float magnet 35 and toggle bar magnet 34 to overcome all upward biasing forces present). The strong magnetic pull of the float magnet 35 (in its raised TRIPPED state) on the toggle bar magnet 34 (still in its raised RUN positioning) then actuates the toggle bar magnet 34 into a very rapid downward movement into its lowered TRIPPED state position, thereby creating a strong snap-locked latching magnetic engagement between the toggle bar magnet 34 and the float magnet 35 (even though they are not in physical contact with one another). The strong latching magnetic engagement created thereby can only be released by manual reset of the float magnet 35 into its original lowered and offset RUN state position. The stronger magnetic attraction created in the present invention through a multiplication of factors (and not simply the buoyancy of a lightweight float body 25) provides enhanced reliability over prior art fluid sensor devices for a trouble-free and reproducible/strong snap-locking action between the two magnets (34 and 35) and reduced malfunction during long-term use. Elevation adjustment capability for float housing 2 relative to a supporting wall of a fluid collection pan (40 or other) is also a new benefit provided by the present invention, allowing fluid-producing system shut-off with a liquid accumulation depth in a supporting fluid collection pan as low as ⅜-inches.

Figure 3:
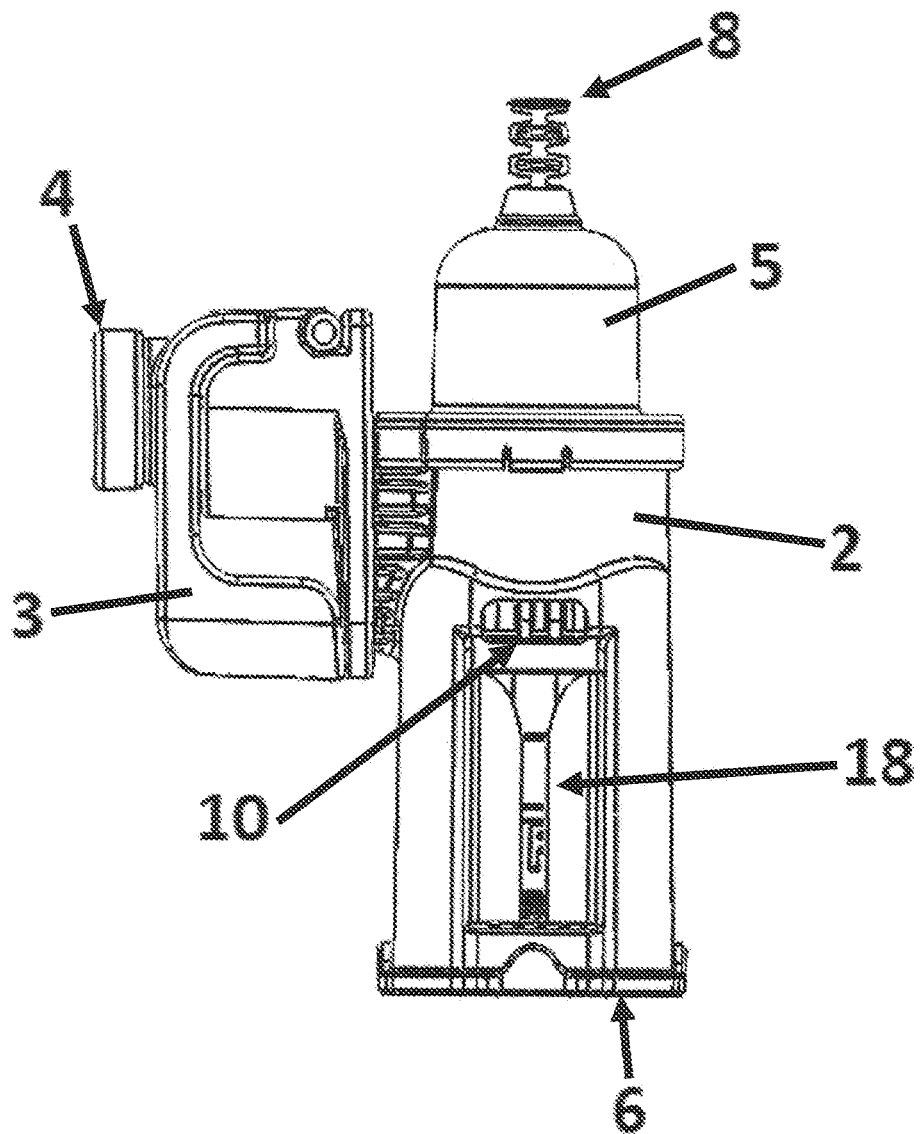
FIG. 3 is a side view of the invention in FIGS. 1 and 2, which shows the C-shaped clamp arm in a closed position against the clamp base, the nut/knob secured against the clamp arm's exterior surface and engaging a fastener extending between the clamp arm and clamp base. The fastener is hidden from view in FIG. 3 by a U-shaped clamp-strengthening member (see FIG. 6) extending horizontally outward from the vertically-extending surface of the clamp base toward the clamp arm when the clamp arm and clamp base are in the closed position of use.
Figure 4:
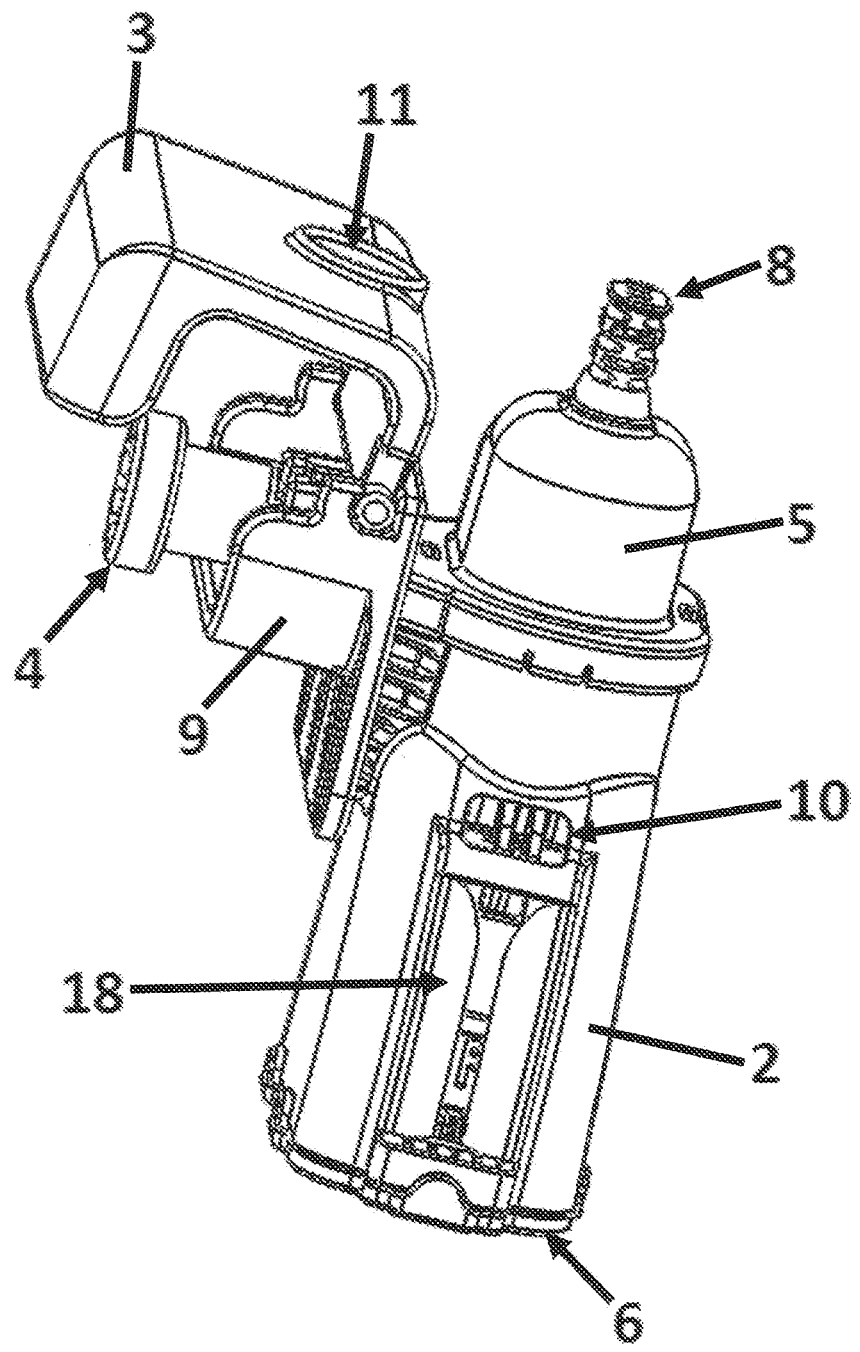
FIG. 4 is a side view of the clamp arm shown in FIGS. 1-3 in an upwardly pivoted position relative to the clamp base. The two opposed ends of the pivot pin integral to the top edge of the clamp arm can only be easily lifted from the receiving notches in the top edge of the clamp base when the clamp arm is in its fully-rotated position. In other clamp arm orientations, the clamp arm and clamp base are not separable from one another, increasing stability of the present invention clamp during its use.

FIGS. 1-4 show exterior views of a first preferred embodiment of the present invention float housing 2, cap top 5, a generally-C-shaped curved/bowed clamp arm 3, and clamp base 9, wherein float housing 2 is not adjustable in elevation relative to clamp base 9 or the fluid collection pan (40 or other) supporting it. FIG. 1 is a perspective view showing multiple fluid passage openings 7 through the base plate 6 under float assembly 29 that typically becomes secured during manufacture to the bottom end of float housing 2. A plurality of stabilizing feet (not shown) may be used on the exterior bottom surface of base plate 6 for some applications, but are not critical or shown in FIG. 1. FIGS. 1-4 also show an enlarged hand-manipulated nut/fastener (4, 16) combination used for connecting clamp arm 3 against the clamp base 9 in fixed association with float housing 2. In addition, FIGS. 1-4 show a cap top 5 supported by the top end of float housing 2 and a wiring harness 8 extending from the top portion of cap top 5. FIGS. 3 and 4 also more clearly show the open channel 18 through which the unattached and freely movable end projection of float frame 28 extends for manual reset of the elevation of float assembly 29 that returns float magnet 35 to its original lowered and offset RUN state positioning. In situ testing of the proper operation of switch 1 can also be accomplished via hand manipulation of the freely movable end projection 28. The freely movable end of float frame 28 when in an elevated UP relative to open channel 18 also readily identifies a TRIPPED state of the present invention to an observer, and when in a lowered DOWN position relative to open channel 18 identifies a RUN state. In addition, when fully rotated upwardly and away from clamp base 9, clamp arm 3 may be separated from clamp base 9 by lifting it in an upwardly direction that releases opposed pivot pins 12 from the notches 13 of clamp base 9. FIGS. 1-4 also show the curved/bowed clamp arm 3 connected to clamp base 9 via engagement of the opposed ends of an integral pivot pin 12 on top of clamp arm 3, each end being received in a different one of the opposed notches 13 (shown clearly in FIG. 5) positioned above and slightly forward of a vertically-extending surface of clamp base 9. In contrast, the second preferred embodiment of clamp shown in FIGS. 17-21 has a curved/bowed clamp arm 3' that is more J-shaped than C-shaped, and it also has a split top edge configuration with integral opposed pivot pins 12' (see FIG. 17) that engage a clamp base 9' also having a split top edge positioned above and slightly rearward to a vertically-extending surface and having opposed notches 13' slightly forward of a vertically-extending surface, the notches 13' each configured for engaging a different one of the pivot pins 12' during clamp use over and against the opposing interior/exterior surfaces of the wall of a fluid collection pan (40, or other). The second preferred embodiment of the present invention clamp is also different from the first clamp embodiment via use of an alignment spring 38 in association with the threaded fastener 16', a hole/opening through the clamp base configured for extension therethrough by the body of externally-threaded fastener 16', wherein the fastener head 17' does not become positioned between the pivoting clamp arm and the clamp base, but instead is secured against rotation in a protective channel formed by the 3-sided upper extension of the connective structure 15' integral to float housing 2.

Figure 5:
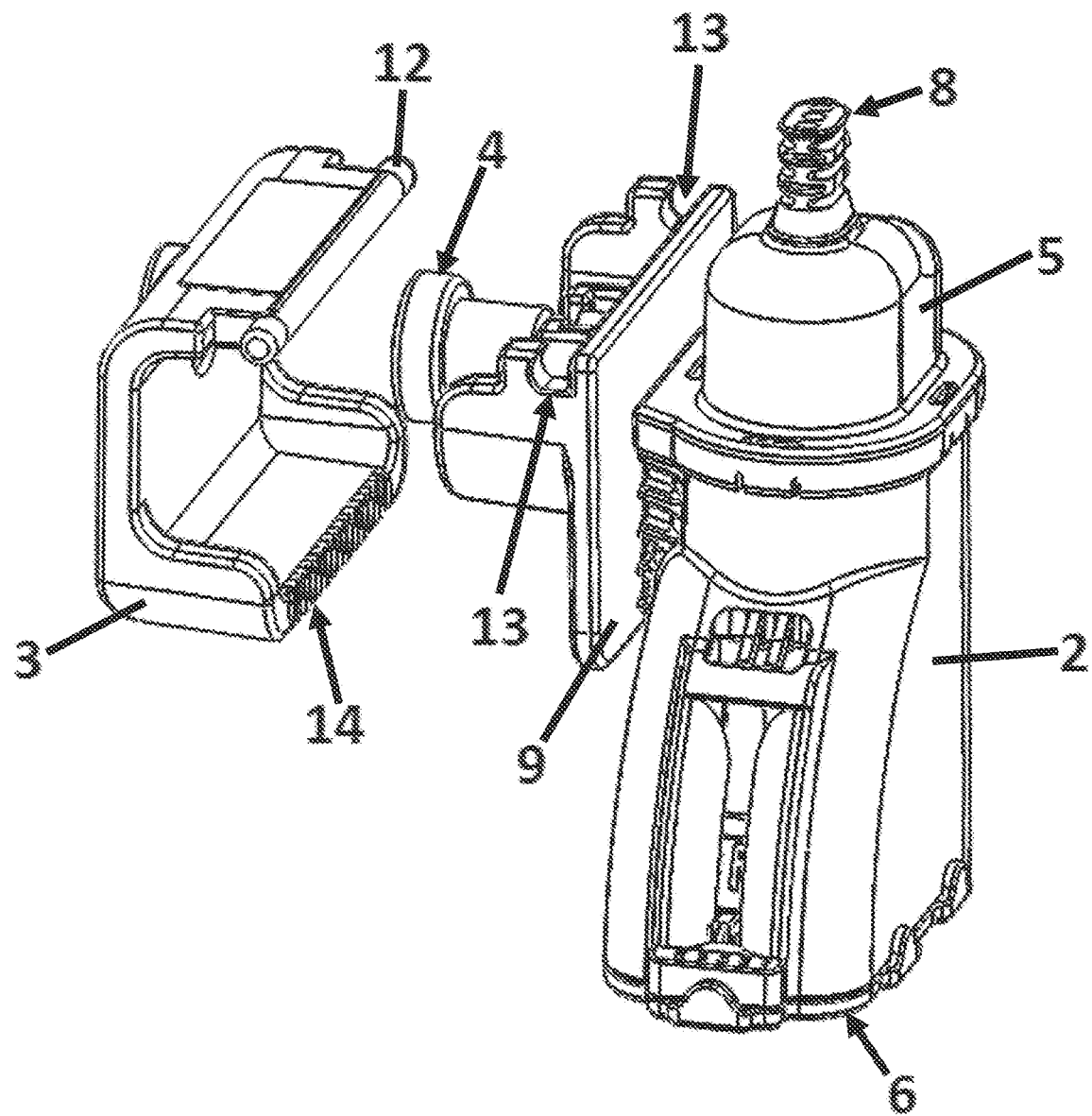
FIG. 5 is a side view of the invention in FIGS. 1-4, with the C-shaped clamp arm separated from the clamp base and showing a preferred configuration of receiving notches used to engage and secure the opposed ends of the integral pivot pin on the top edge of the clamp arm.
Figure 7:
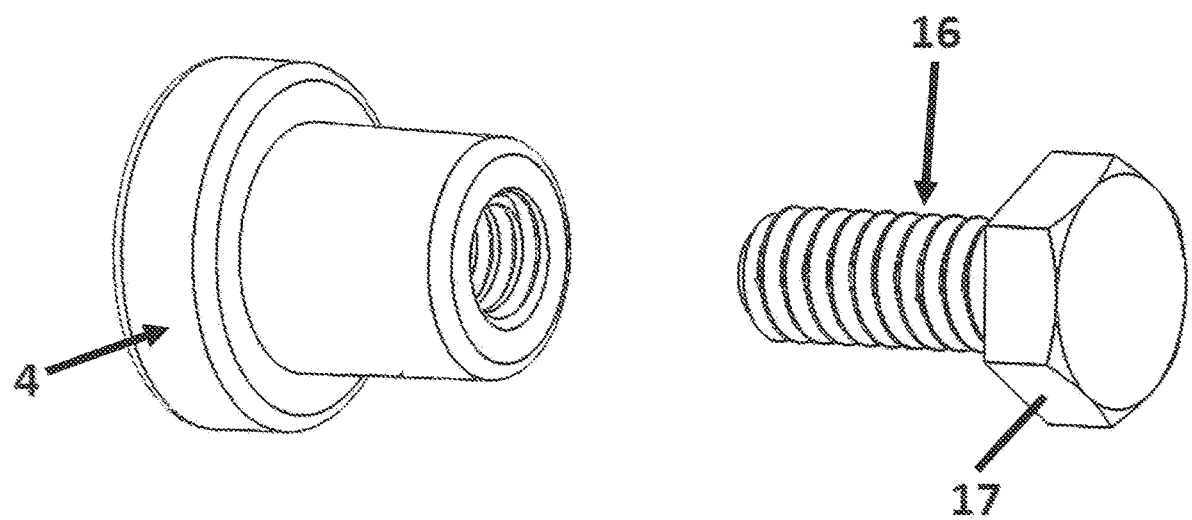
FIG. 7 is an enlarged side view of the hand-manipulated nut/knob with an internally-threaded extension and the fastener shown in FIGS. 1-6, both of which are usable as part of the present invention. Although a fastener with a hex head is shown, any fastener head configuration may be used that is able to prevent rotation of the connected fastener's externally-threaded body when the fastener head is inserted into the hollow receptacle and the nut/knob and its extension are progressively tightened against the externally-threaded fastener body to fix the upper portions of clamp arm and clamp base securely over and against the opposing surfaces of a fluid collection pan wall.

FIGS. 5-7 show more detail about the clamp arm 3 connection to clamp base 9 and the ease with which clamp arm 3 can be connected and removed from clamp base 9. FIG. 5 is a side view of the invention in FIGS. 1-4, and showing the preferred and elongated integral pivot pin 12 of clamp arm 3 separated from the receiving notches 13 on the rear top surface/edge of clamp base 9. The hand-manipulated nut/knob 4 is still in its position of use in FIG. 5. FIG. 6 is a view of the invention in FIGS. 1-5 and rotated 90-degrees from that shown in FIG. 5, wherein the clamp arm 3 is also removed from clamp base 9, and hand-manipulated nut/knob 4 is removed from its connection with externally-threaded fastener 16. However, the head 17 of fastener 16 remains within the hollow receptacle 15 outwardly extending from clamp base 9 wherein release of head 17 from hollow receptacle 15 requires an applied upward force to slide head 17 upwardly and away from the open top end of hollow receptacle 15. In contrast, FIG. 7 is an enlarged side view of a preferred hand-manipulated nut/knob 4 and the fastener 16 with a head 17 that when positioned within hollow receptacle 15 cannot rotate, facilitating attachment of nut/knob 4 to the distal end of fastener 16 for securing clamp arm 3 against clamp base 9 onto the top of a fluid collection pan wall (not shown) without any lean-in that could otherwise diminish the reliability of float switch 1 response to liquid accumulation in the associated collection pan. It is not contemplated for the configuration of fastener head 17 to be limited to the hexagonal configuration shown in FIG. 7.

Figure 8:
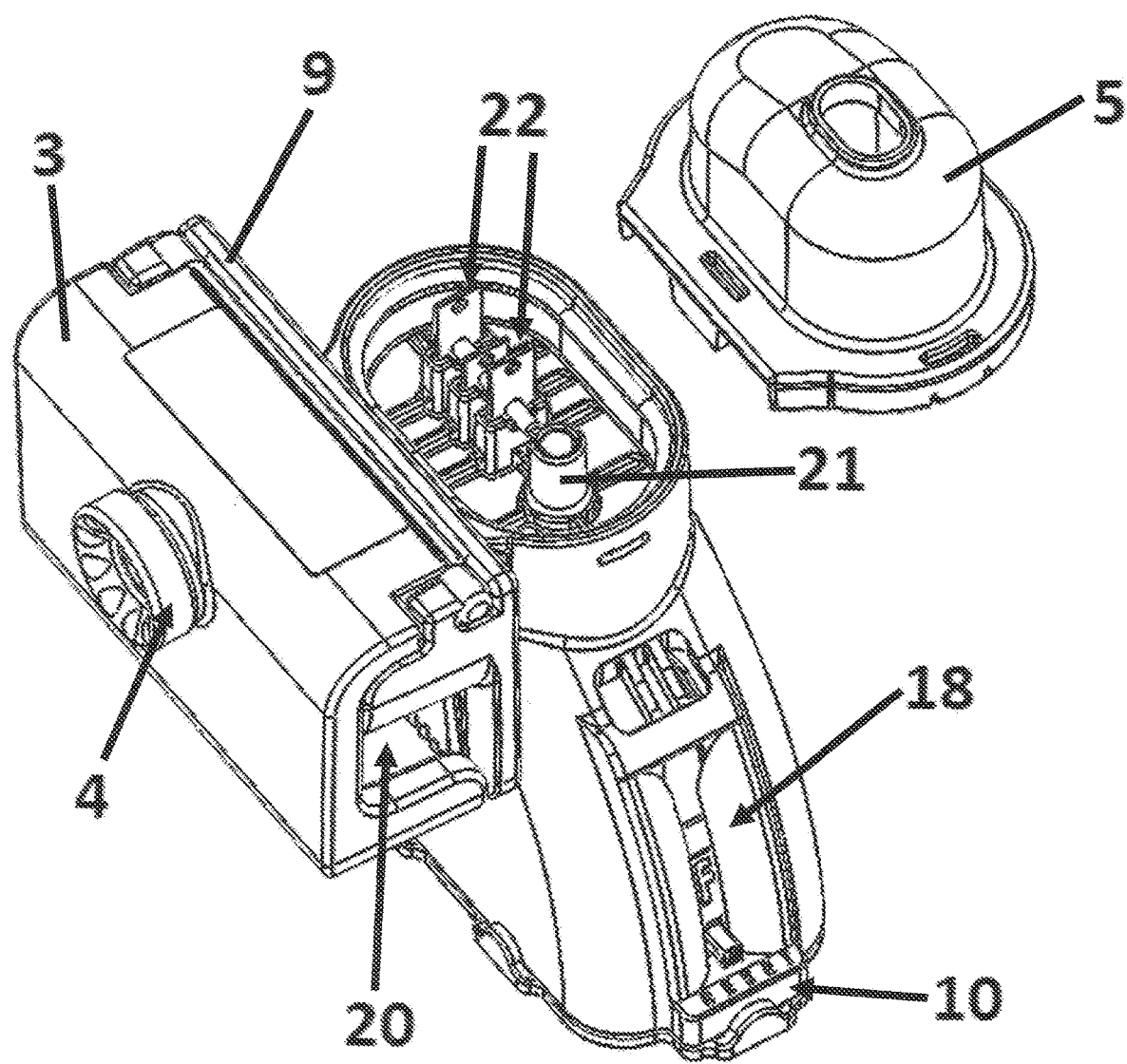
FIG. 8 is a top perspective view of the invention in FIGS. 1-7 and its cap top removed from the float housing to reveal preferred electrical contacts and an upwardly-biasing magnetic pull piece supported by a terminal block.
Figure 9:
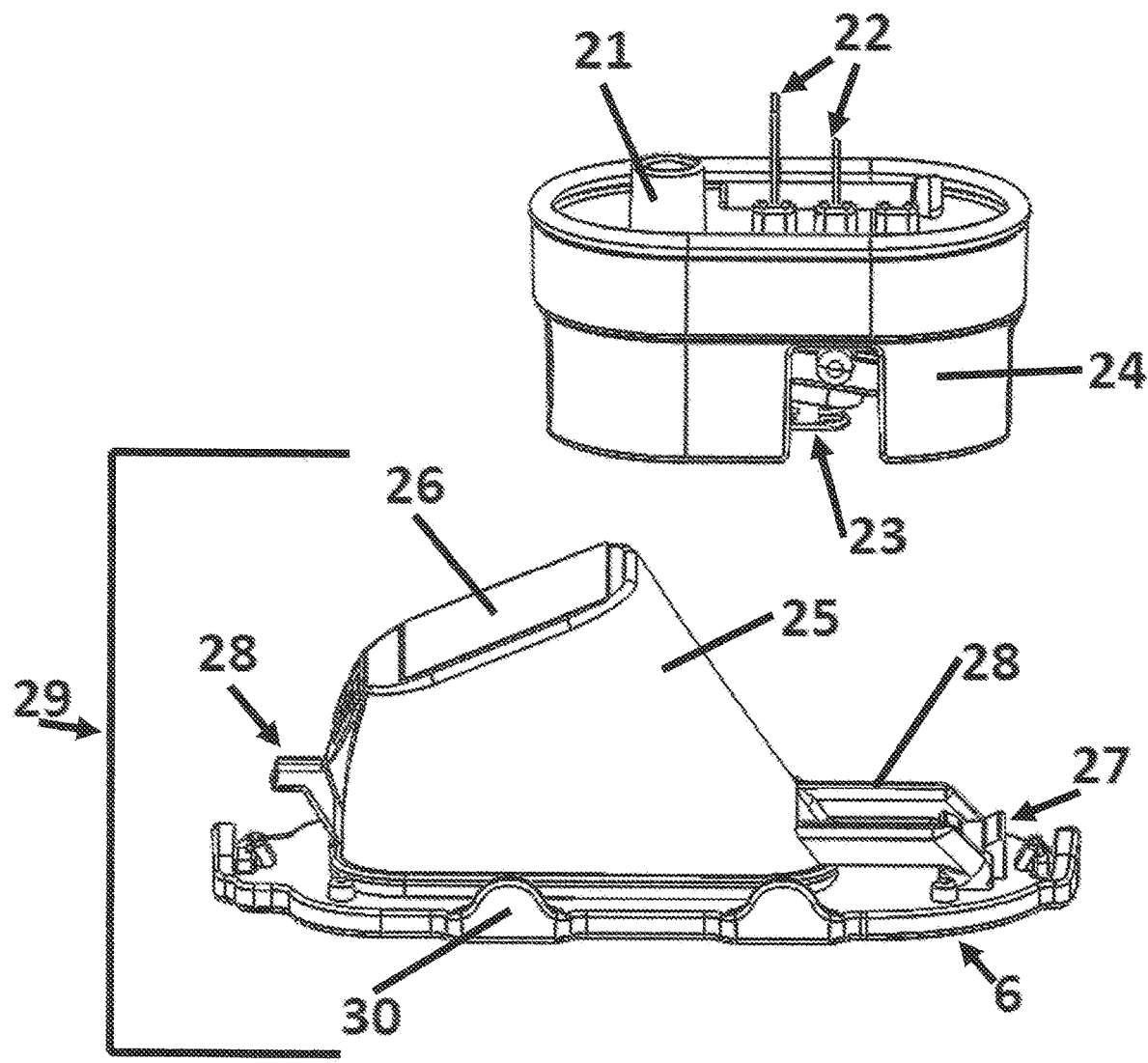
FIG. 9 provides side views from the top of the terminal block and the float assembly used in the first preferred embodiment of the present invention latching magnetic float switch, each supporting a different one of the magnets (not visible in FIG. 9) that become forcefully snap-locked together via strong magnetic attraction to achieve TRIPPED state positioning that shuts off electrical power to an associated fluid-producing system.
Figure 10:
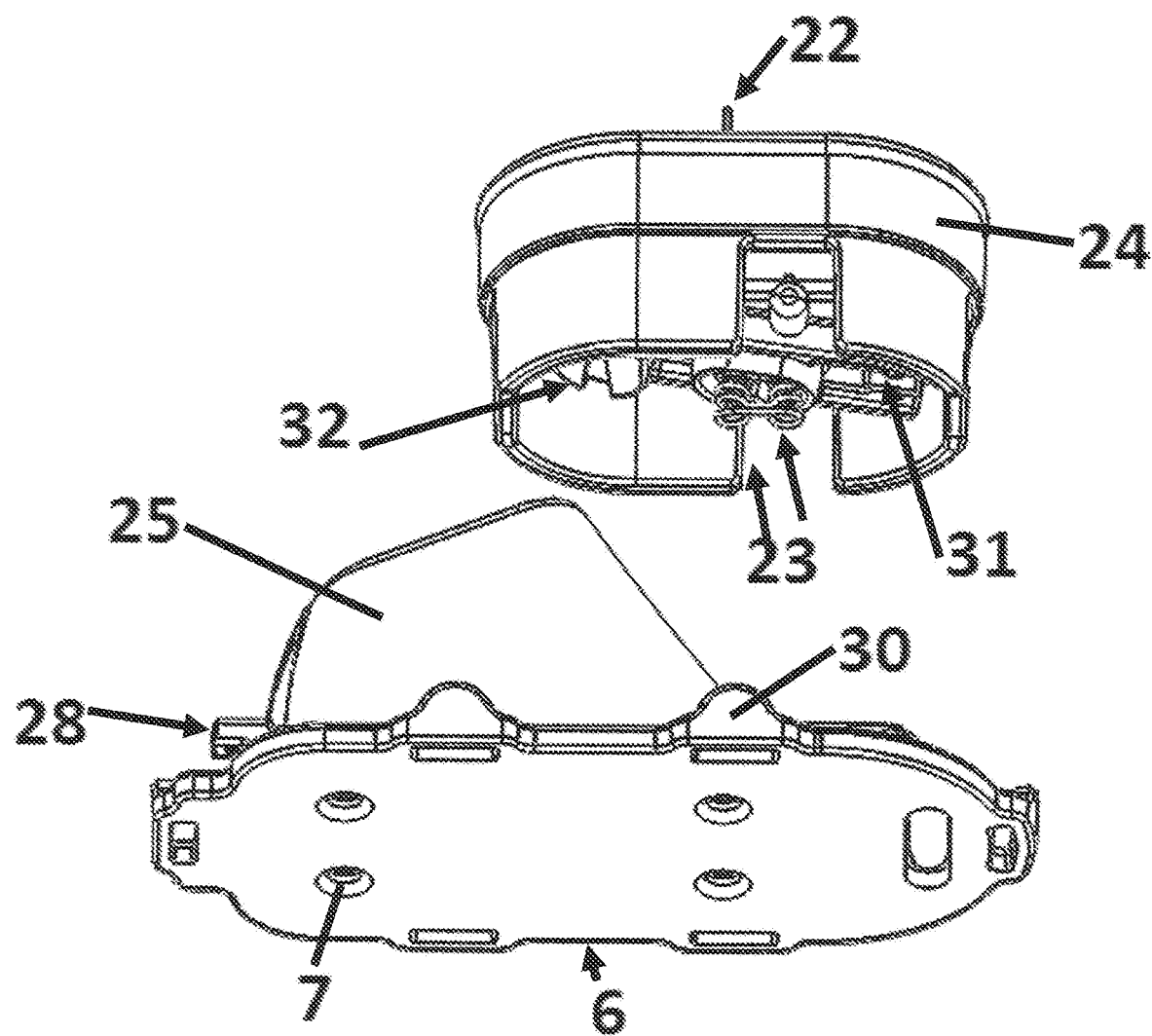
FIG. 10 is a perspective view from the bottom of the terminal block and the float assembly in FIG. 9, the terminal block revealing two springs and a magnet housing representing upward biasing influence associated with a toggle bar, with FIG. 10 also showing the base plate with fluid passage openings that is attachable to the float housing and supports the buoyant upper float member and float frame that are both part of the float assembly structure.
Figure 11:
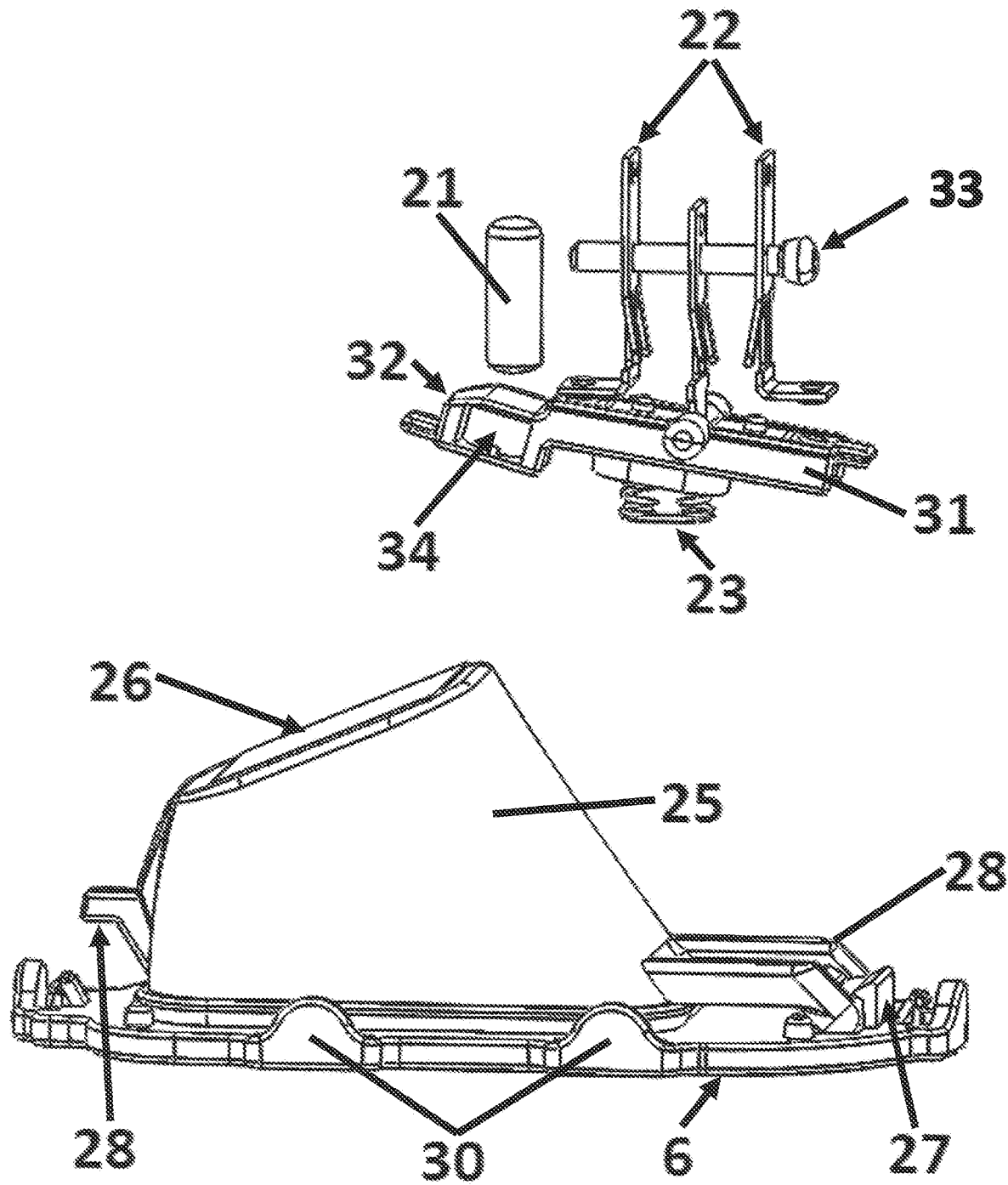
FIG. 11 is a perspective view from the side of the present invention structure in FIG. 10, the terminal block is removed to reveal two upwardly-biasing springs under the toggle bar, a toggle bar magnet secured to one end of the toggle bar through use of a magnet housing, an upwardly-biasing pull piece in the form of a metal socket screw/pin positioned above the toggle bar magnet, two sets of paired electrical contacts used to open and close electrical communication with the wiring harness are also positioned above the toggle bar with each lower paired contact having support by the toggle bar, and a retainer pin used for separating and maintaining fixed positioning of the electrical contacts relative to each other and the toggle bar while it pivots alternatively end-to-end to open one set of paired electrical contacts while the other set closes.
Figure 12:
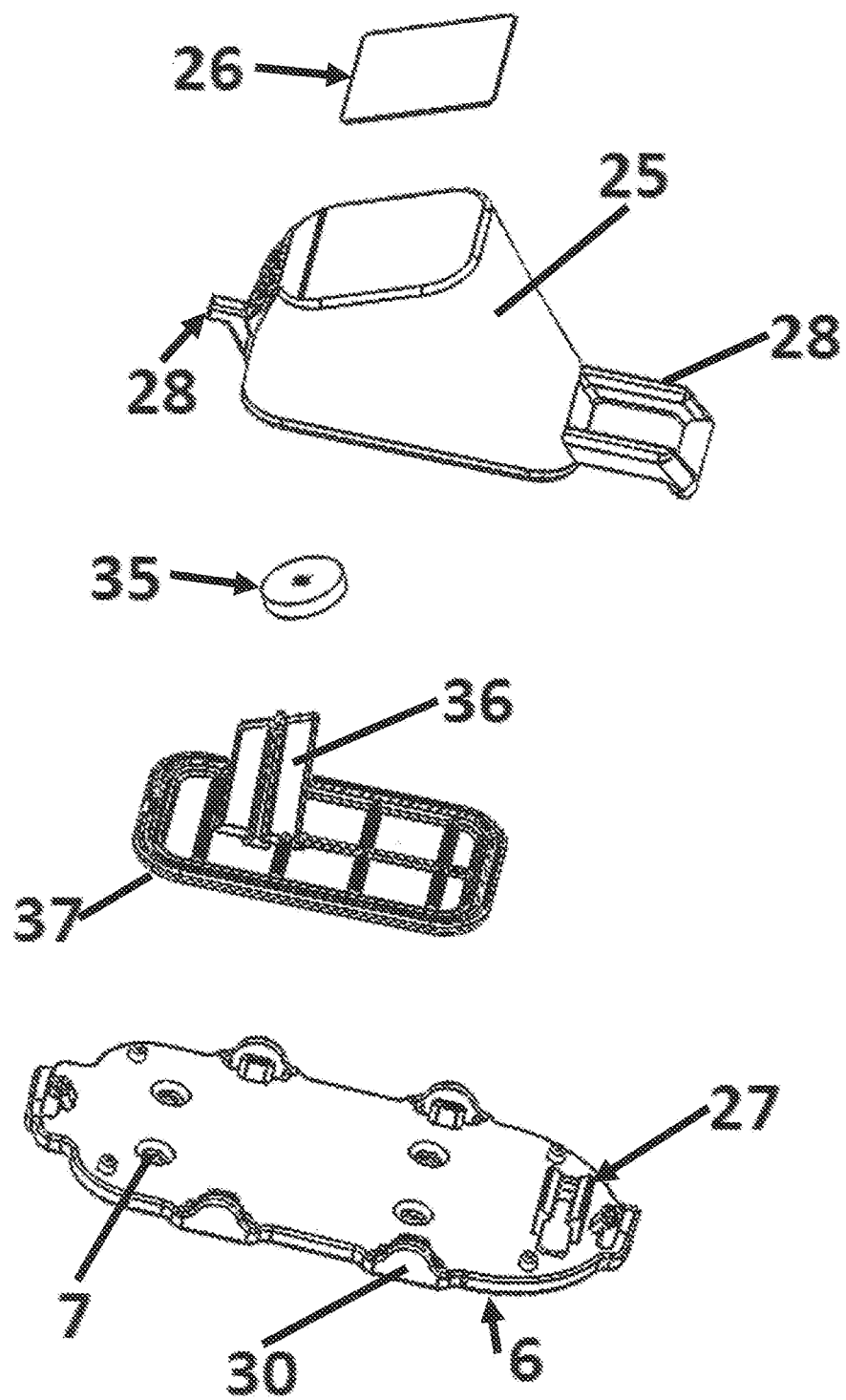
FIG. 12 is an exploded view of the float assembly previously shown in FIG. 11 for the first preferred embodiment of the present invention, and showing the buoyant upper float member preferably having a lower end length dimension greater than that of its upper end, a float frame supporting the upper float member, a float sticker which can be used to indicate RUN or TRIPPED positioning of the float assembly through the trip indicator window shown in FIG. 3, a lower float support establishing fixed positioning of a pillar support used to provide fixed float magnet positioning relative to the upper float member during extended present invention use, and a base plate having at least one fluid passage opening, an integral float pivot 27, and at least one snap-fit tab preferably used for attachment of the base plate securely against the bottom end of the float housing.

FIGS. 8-12 show additional detail about the portion of float housing 2 supporting the toggle bar and float magnets (34 and 35), as well as preferred structure and positioning of the magnets (34 and 35) and their supporting structures. FIG. 8 is a top perspective view of the invention in FIGS. 1-7 and with its cap 5 removed to reveal electrical contacts 22 and a biasing pull piece 21. FIG. 8 also shows the gap 20 wherein the flared top portion of a fluid collection pan wall (not shown) could be accommodated between clamp arm 3 and clamp base 9 after they are securely fixed against one another by fastener 16. FIGS. 9 and 10 are respectively perspective views from the top and bottom of the invention in FIGS. 1-8 with the cap top 5, float housing 2, clamp arm 3, and clamp base 9 removed to reveal a terminal block 24 and float assembly 29. FIG. 9 shows two sets of paired electrical contacts 22 and an upwardly biasing pull piece 21 supported by terminal block 24 and used to draw and maintain upper toggle bar magnet 34 away from the lower float magnet 35 in the RUN state, and two biasing contact springs 23 below toggle bar 31 (springs 23 and toggle bar 31 are also shown in FIG. 10). FIG. 9 further shows the assembled float assembly 29 with the non-elevating end of float frame 28 secured to the float pivot 27 on the upper surface of base plate 6. FIG. 9 also shows multiple snap-fit tabs 30 used to secure base plate 6 to the bottom end of float housing 2 and also position buoyant upper float member 25 and lower float support 37 supporting float magnet 35 for upward movement within the bottom end of float housing 2. FIG. 9 further shows the elevating end of float frame 28 extending away from upper float member 25 for use in resetting float magnet 35 from a TRIPPED state into the RUN state for additional fluid monitoring use. FIG. 10 is a perspective view from the bottom of the terminal block 24 and float assembly 29 previously seen in FIG. 9, and in FIG. 10 the terminal block 24 is shown in association with two springs 23, toggle bar 31, a magnet housing 32 associated with toggle bar 31, and an electrical contact 22 extending above terminal block 24. FIG. 10 also shows base plate 6 having multiple fluid passage openings 7 and the upper float member 25 and float frame 28 of float assembly 29 supported by base plate 6. FIG. 11 is a perspective view from the side of the portion of the present invention in FIG. 10, now with its terminal block 24 removed to expose two springs 23 under a toggle bar 31, and a toggle bar magnet 34 secured via magnet housing 32 to the top surface of one end of toggle bar 31. FIG. 11 also shows biasing pull piece 21 positioned for use above magnet housing 32, three electrical contacts positioned above toggle bar 3 1and a retainer pin 33 separating and supporting fixed positioning of electrical contacts relative to toggle bar 31. In addition, FIG. 11 shows base plate 6 supporting float frame 28 and upper float member 25, with the non-elevating end of float frame 28 secured to float pivot 27. Furthermore, FIG. 11 shows tabs 30 used to provide snap-fit connection of base plate 6 to the bottom end of float housing 2 and upper float member retaining magnet 35 in its intended association with lower float support 37. FIG. 12 is an exploded view of the float assembly 29 shown in FIG. 11, and including float sticker 26, float magnet 35 relative to upper float member 25, float frame 28 supporting upper float member 25, a pillar support 36 and lower float support 37 in combination helping to support stable positioning of lower magnet 35 from below while associated with upper float member 25, and base plate 6 that is positioned under float frame 28 during use of latching magnetic float switch 1.

Figure 13:
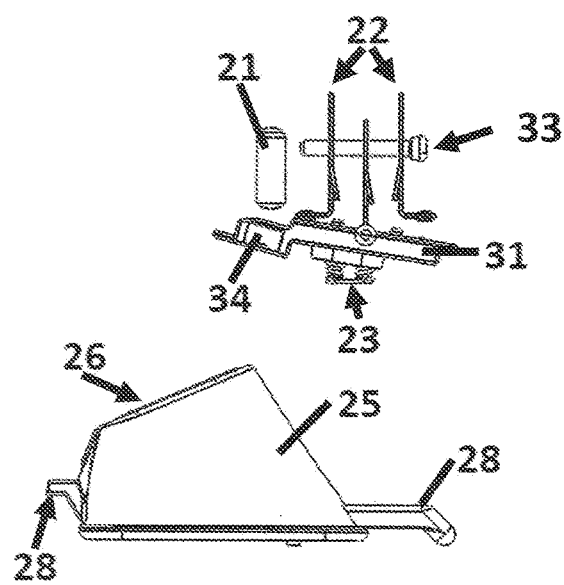
FIG. 13 is a side view of invention components in FIG. 11 without the base plate and showing the upper float member (with the float magnet therein) and the float frame in the lowered RUN state position with a large gap between the upper float member and the toggle bar magnet, the terminal block components (including the toggle bar magnet) in the upwardly-biased and raised RUN state position, the toggle bar magnet and the float magnet separated and offset from one another to create a gap that lessens magnetic attraction between them so that the RUN state can be maintained until liquid enters the float housing and comes into contact with the float assembly to move it a small distance toward its TRIPPED state actuator position wherein thereafter increasing magnetic attraction between the float and toggle bar magnets accelerates upward float magnet pivoting movement until its TRIPPED state actuator position is reached, which has been predetermined to overcome all upward biasing influence maintaining the toggle bar magnet in its raised RUN state position, and once all upward biasing influence is overcome, the toggle bar magnet forcefully and suddenly moves in a downwardly direction toward the float magnet, where the magnets become strongly magnetically-latched together into a snap-locked relation, and remain in the latched state until the float magnet is manually reset to its lowered offset RUN state position (which then releases the toggle bar magnet for prompt return to its raised RUN state positioning).
Figure 14:
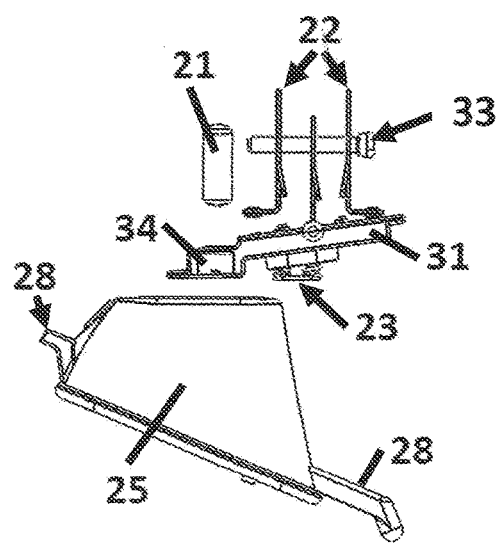
FIG. 14 is a side view of the invention components in FIG. 13, showing the TRIPPED state positioning wherein the toggle bar magnet and float magnet have become aligned with their magnetic fields strongly attracted to one another in a latched engagement.
Figure 15:
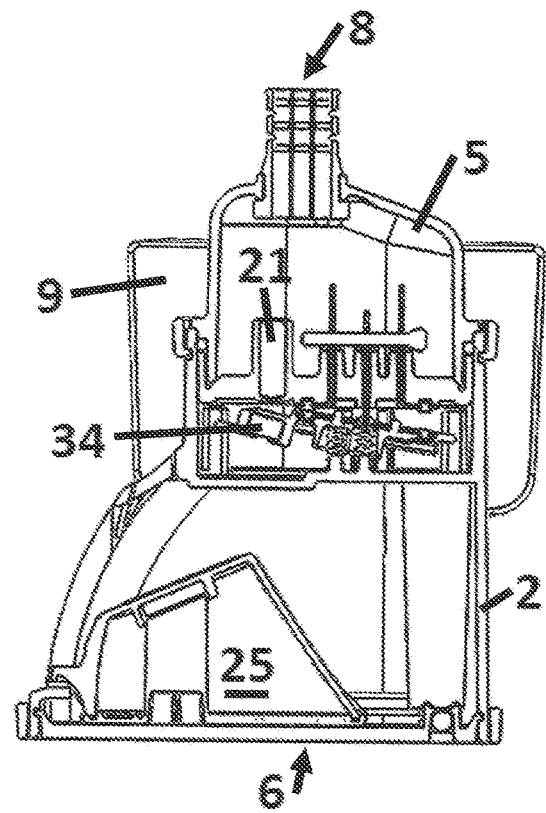
FIG. 15 is a section view of the invention components in FIG. 13 shown protected by the float housing, the cap top, and base plate, with the float assembly being in the lowered RUN state position adjacent to the base plate, the terminal block components (including the toggle bar magnet) being in the raised RUN state position, the toggle bar magnet and the float magnet having separated and offset positioning from one another creating a large gap between them, the set of paired electrical contacts immediately to the right of the toggle bar magnet closed against one another to create the RUN state where electrical power to an associated fluid-producing system is maintained, and the second set of paired electrical contacts associated with the opposed end of the toggle bar separated from one another.
Figure 16:
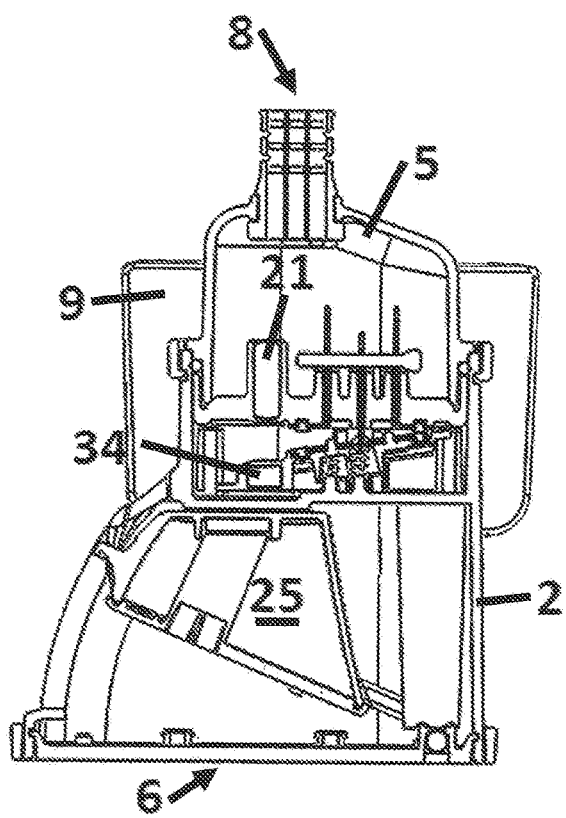
FIG. 16 is a section view of the invention components shown in FIG. 14 protected by the float housing, the cap top, and base plate, with the float assembly being in its elevated TRIPPED state actuator position (fluid-producing system shut-off mode) adjacent to the cap top, the terminal block components (including the toggle bar magnet) being in their lowered TRIPPED state positions and situated close to the float magnet without any gap between magnets, with strong magnetic forces holding the toggle bar and float magnets in close 'snap-locked' magnetic engagement with one another (and no discernable gap between them even though direct physical contact with one another is not present). It then takes manual reset of the float magnet and its supporting float assembly to the lowered RUN state position shown in FIG. 15 (which thereafter releases the strongly locked and lowered positioning of the toggle bar magnet so that biasing forces raise, return, and maintain the toggle bar magnet in its raised RUN state position).

FIGS. 13 and 14 are respectively side views of invention components shown in FIG. 11 with RUN and TRIPPED positioning, and FIGS. 15 and 16 are section views respectively showing invention components in FIG. 11 within float housing 2 and having RUN and TRIPPED positioning. FIG. 13 is a side view of invention components shown in FIG. 11 and having a RUN positioning, with magnets separated. FIG. 14 is a side view of the invention components shown in FIG. 11 and having TRIPPED positioning with strong magnetic forces holding magnets 34 and 35 in close latching association with one another. FIG. 15 is a section view of the invention components shown in FIG. 13 protected by float housing 2, cap top 5, and base plate 6, and in the RUN state, with magnets separated and a large gap between them that lessens magnetic attraction. In contrast, FIG. 16 is a section view of the invention components shown in FIG. 14 protected by float housing 2 and in TRIPPED (system shut-off) state, with strong magnetic forces holding magnets 34 and 35 in close association with one another, and return to the RUN state requiring manual reset of the upper float member 25 in the positioning shown in FIG. 15.

Figure 17:
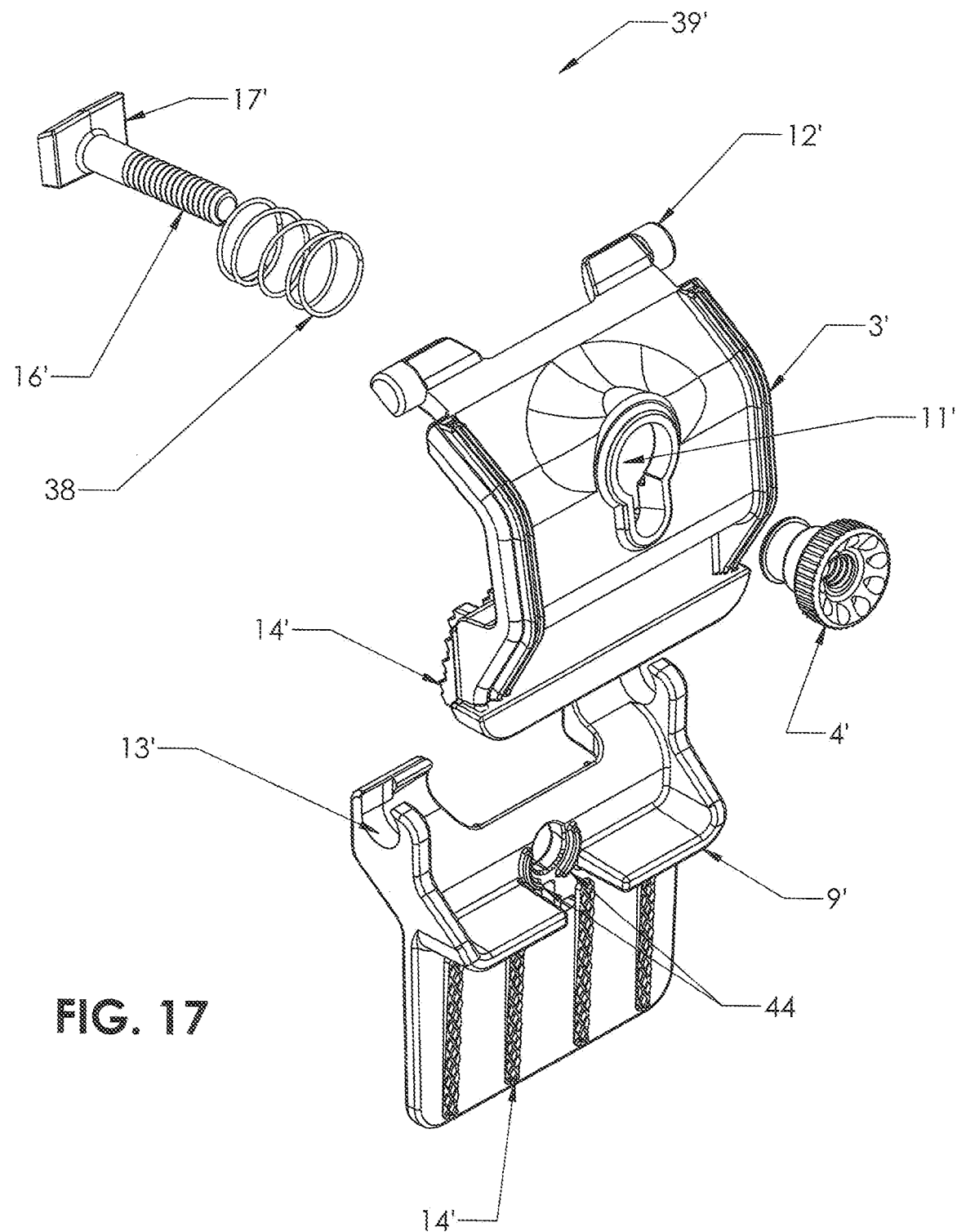
FIG. 17 is an exploded perspective view from the top of a second preferred embodiment of clamp usable as a part of the invention disclosed herein that can allow in situ elevation adjustment of the float housing relative to the clamp base and the pan wall upon which the clamp base is supported.

FIGS. 17 and 18 are both exploded views of a second preferred embodiment of clamp 39' that is also usable as a part of the latching magnetic float switch 1 invention herein to place float housing 2 in fixed relation to a selected wall of a fluid collection pan 40 (or other) for monitoring depth of liquid as it accumulates in the supporting pan and shut off of the fluid-producing system in fluid communication with the pan as needed to prevent harm to the system and/or surroundings. However, clamp 39' also allows elevation adjustment of float housing 2 relative to clamp base 9' as it remains fixed upon the fluid collection pan (40 or other) supporting float housing 2. FIG. 17 shows clamp 39' having an enlarged hand-manipulated nut (or knob) 4', a fastener 16' with a flattened and rectangular rotation-resisting fastener head 17', and a fastener alignment spring 38 preferably assisting engagement and loosening of fastener 16' with nut (or knob) 4' and its extension to securely tighten (and loosen or disengage) the connection of a curved/bowed clamp arm 3' with clamp base 9'. The configuration of curved/bowed upper portion of clamp arm 3' as shown in FIG. 17 can be identified generally as C-shaped or J-shaped. Also, since the fastener alignment spring 38 used to guide connection of nut/knob extension 4' during its threaded engagement with fastener 16' remains positioned between clamp arm 3' and clamp base 9' during their use together to stabilize float housing 2 during its liquid accumulation depth monitoring, the interior positioning of alignment spring 38 between clamp arm 3' and clamp base 9' also provides a slight separation of clamp arm 3' and clamp base 9' during elevation adjustment of float housing 2 when nut/knob 4' is slightly loosened from fastener 16', allowing clamp arm 3' and clamp base 9' to remain in their installed positions during the float housing 2 elevation adjustment relative to the interior bottom surface of the supporting fluid collection pan (40 or other). FIG. 17 also shows the fastener opening through clamp base 9' having a spring guide 44 formation present on each side thereof which helps clamp alignment spring 38 to more readily assume appropriate positioning for easy tightening of the upper portion of clamp arm 3' to the upper portion of clamp base 9'. FIG. 17 further shows horizontally-extending and clamp-strengthening structure present between the top edge notches 13' and lower non-slip/gripping surfaces 14' in the most preferred embodiments of the present invention clamp base 9' having a wide U-shaped configuration similar to that shown for the first preferred embodiment of clamp base 9 in FIG. 6. However, FIG. 17 further shows the strengthening structure in the second preferred embodiment having a central separation (not present in FIG. 6) to remove any interference with fastener 16' when it is present and clamp arm 3' and clamp base 9' are joined together. Unlike the positioning of fastener head 17 in the first preferred embodiment of the present invention within a hollow receptacle 15 integral to clamp base 9, fastener head 17' is instead positioned between float housing 2 and a protective channel formed by the 3-sided upper structure of the connective structure 15' integral to float housing 2, which moves with float housing 2 during its elevation adjustment. The protective channel prevents rotation of fastener head 17' (and that of the externally-threaded body of fastener 16' connected to it) whenever engagement, disengagement, or loosening of fastener 16' and nut (or knob) 4' occurs. When increased or decreased elevation of float housing 2 relative to the wall of its supporting fluid collection pan (40 or other) is desired, the threaded connection of fastener 16' and nut/knob 4' is slightly relaxed/loosened to allow vertical movement of the connective structure (both integral to and/or supported by float housing 2) relative to fastener 16', fastener head 17', and clamp base 9' which all remain in fixed association with the fluid collection pan (40 or other) upon which they remain installed. When a new/desired elevation of float housing 2 relative to the fluid collection pan wall (40 or other) supporting float housing 2 is reached, fastener 16' and nut/knob 4' are again tightened to firmly secure clamp arm 3' and clamp base 9' against the opposing surfaces of the supporting pan wall (40 or other) to prevent further/inadvertent elevation change of float housing 2. In addition, FIG. 17 shows the preferred configuration of the non-slip/gripping surface 14' on the lower portion of clamp base 9' comprising multiple ridges which could contain surface texture, overmold, and/or resilient material applied in a variety of shapes and patterns that assist clamp base 9' in achieving a firm/secure engagement with a fluid collection pan wall (40 or other) for enhanced stability of float housing 2 during its fluid depth monitoring and shut-off activity. FIG. 17 also reveals additional details about clamp arm 3' structure, including a top edge with a split pivot pin 12' configuration allowing clamp arm 3' accommodation for movement of fastener stabilizing structure 15' during elevation adjustment of float housing 2 relative to the interior bottom surface of the supporting fluid connection pan wall (40 or other), the split pivot pin 12' configuration providing two opposed pivot-pin-like ends each with a partially-flattened circular cross-section allowing engagement with a different one of the opposed receiving notches 13' formed into the top surface/edge of clamp base 9', wherein the split pivot pin 12' configuration is only releasable from notches 13' when clamp arm 3' has fully-rotated positioning away from clamp base 9'. The flattened areas in the circular configuration of pivot pins 12' provide a visual reference for users to quickly identify the release positioning of pivot pins 12' from notches 13', which most readily occurs as the flattened areas assume a vertically-extending orientation. FIG. 17 further shows the preferred keyhole configuration for the opening 11' in clamp arm 3', nut/knob 4' preferably having an exterior gripping surface facilitating hand-manipulation, nut/knob 4' also having an extension sized for insertion through the opening 11', with nut/knob 4' further preferably having interior threads extending fully through it. In contrast, FIG. 18 shows the clamp 39' in FIG. 17 with the curved/bowed clamp arm 3' now in a position to show preferred lower structure intended for firm/non-slipping engagement with the wall of a fluid collection pan 40 (or other) and the clamp base 9' showing structure adjacent to the central fastener opening in clamp base 9' that assists in securing fastener head 17' in a fixed position while hand-manipulated nut (or knob) 4' is tightened against the spring 38 and the distal portion of the externally-threaded body of fastener 16' during connection of clamp 39' to the wall of a fluid collection pan 40 (or other). FIG. 18 further shows clamp arm 3' having gripping structure 14' used against the wall of a fluid collection pan 40 (or other) during present invention use, fastener head 17' having unnumbered markings on its distal end (which are not critical to its function and may differ from that shown), a preferred fastener alignment spring 38 used to assist mounting of clamp 39' over the wall of fluid collection pan 40 (or other pan), the opposing ends of a split pivot pin 12' configuration each having a partially flattened edge (whereas the opposing ends of integral pivot pin 12 are each shown to have a circular configuration), and the round opening 11' in clamp base 9' through which threaded fastener 16' is inserted has a key 42 beneath it configured for engagement with a vertically-extending keyway 41 (shown and identified in FIG. 21) through the anti-rotational connective structure 15' between float housing 2 and clamp base 9' (and only integral to float housing 2) that are used during elevation adjustment of float housing 2 relative to the interior bottom surface of a fluid collection pan (40 or other). FIG. 18 also shows guide rails 43 that facilitate movement of float housing 2 during its elevation adjustment activity.

Figure 21:
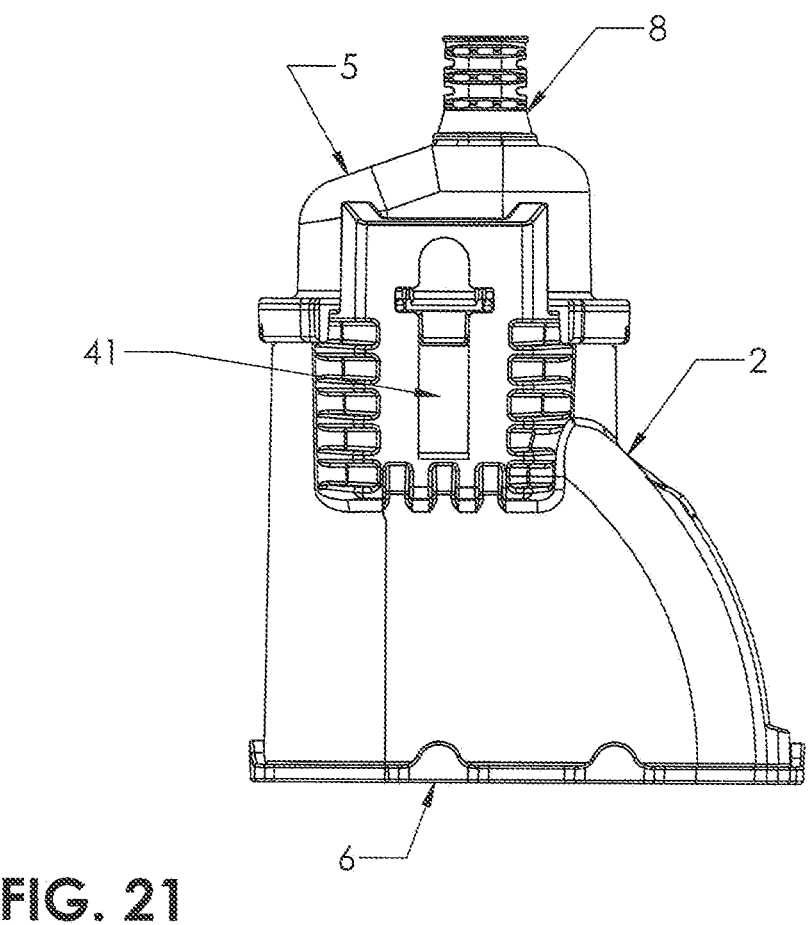
FIG. 21 is a view of the float housing in FIGS. 17-20 from its clamp side and as it would appear with the clamp base and curved/bowed clamp arm missing to identify the most preferred positioning of the rigid strengthening and fastener-stabilizing connective structure (preferably made of molded material) integral only to the float housing. See an additional view of a portion of the connective structure adjacent to the clamp base in FIG. 22. The clamp base is separable from the float housing only when the fastener is withdrawn from the clamp arm, clamp base, and keyway in the connective structure integral to the float housing. The 3-sided upper extension of the connective structure defines part of a fastener-head-stabilizing and protective channel between the clamp base and the cap top supported upon the top end of the float housing, and it is this protective channel that moves with the float housing during its elevation adjustment (relative to that of the stationary fastener head and stationary clamp base that remains fixed in elevation upon a supporting fluid collection pan wall 40 (or other), which is possible upward and downward relative to the bottom interior surface of the fluid collection pan to provide liquid accumulation depth monitoring as low as needed at an installation site to a minimum depth of approximately ⅜-inches. A small portion of the 3-sided upper extension can be seen immediately to the right of the fastener head behind cap top 5 in FIG. 19. The protective channel between the 3-sided upper extension and cap top also has other functions, including preventing rotation of the head of the fastener used to bring the clamp arm pivotally toward the clamp base while securing them together against the opposed surfaces of a fluid collection pan wall as a hand-manipulated nut (or knob) is progressively threaded onto the fastener's opposing distal end. In addition, the connective structure and protective channel together distribute forces potentially compromising float housing stability during its use.

FIGS. 19-22 also relate to the second preferred embodiment of clamp 39' shown in FIGS. 17 and 18, and reveal additional structure providing elevation adjustment of float housing 2 relative to the fluid collection pan 40 and the clamp base 9' in fixed association with the pan's wall. Fluid collection pans (40 and other) usable with the present invention may include plastic pans with walls having varying upper edge configurations and draft angles, in addition to metal pans generally having a vertically-extending and straight-walled construction. As shown in FIGS. 19 and 20, the pan wall to which clamp 39' is mounted has an approximate 3-inch height dimension. Clamp 39' attached over and against the wall of fluid collection pan 40 may place the bottom of float housing 2 very close to the interior bottom surface of fluid collection pan 40 (depending on the pan wall height), or in the alternative elevation adjustment of float housing 2 can occur to make the positioning of float housing 2 better adapted upward or downward to a needed application. The clamp bases 9 and 9' of the latching magnetic float switch invention 1 herein respectively used with the curved/bowed clamp arms 3 and 3' (base 9 and arm 3 shown in FIGS. 4-6, and also base 9' and arm 3' shown in FIGS. 19 and 20 mounted onto the wall of pan 40) are configured for use with a variety of fluid collection pan sizes and wall configurations. FIG. 19 is a perspective view' from the top of a float housing 2 connected to the second preferred embodiment of clamp 39', and clamp base 9' and C-shaped clamp arm 3' of clamp 39' together securely fixed against opposing sides of a vertically-extending wall of a fluid collection pan 40 through use of a hand-manipulated nut (or knob) 4' and tightened against fastener 16'. FIG. 19 is a perspective view showing the clamp 39' behind the associated float housing 2 and cap top 5, and also shows a small part of the rectangular head 17' associated with threaded fastener 16' visible behind the right portion of the cap top 5 secured against the top end of float housing 2. In contrast, FIG. 20 is a side view of the float housing 2 connected to the second preferred embodiment of clamp 39' with the clamp base 9' and generally C-shaped clamp arm 3' of clamp 39' joined together at their upper edges via engagement of split pivot pin 12' with the receiving notches 13' formed into the top edge of clamp base 9', and clamp 39' further secured onto the wall of pan 40 by threaded engagement of a hand-manipulated nut/knob 4' and threaded fastener 16' tightened together, while clamp arm 3' and clamp base 9' each securely engage a different opposing side of a vertically-extending wall of a fluid collection pan 40 (or other). FIG. 20 also shows the float housing 2 having a free end projection 28 (marked by a numerical designation of 28 in the lower left side of FIG. 11), in a lowered position that identifies the RUN state position of the upper float member 25 shown in FIG. 16. In addition, FIGS. 19 and 20 both show the top of clamp 39' having a near maximum elevation adjustment relative to float housing 2 and cap top 5, allowing the bottom of float housing 2 to become situated close to the bottom interior surface of fluid collection pan 40 for shut off of an associated fluid-producing system (not shown) after only a very small amount of fluid accumulation occurs in pan 40. FIGS. 21 and 22 together reveal more information about the connective structure 15' in the second embodiment of the present invention (previously shown in FIGS. 17-20) that is integral only to the exterior of float housing 2 (and has functional association with clamp base 9', but no direct contact with it). Connective structure 15' contains the vertically-extending keyway 41 and a 3-sided upper extension, and during elevation adjustment activity of float housing 2, connective structure 15' moves in unison with float housing 2. Connective structure 15' also provides additional stabilization to float housing 2 during elevation adjustment activity, as well as otherwise during float housing 2 installation and support by a fluid collection pan wall. In addition, the most preferred connective structure 15' in the 3-sided upper extension is configured for close association with the flattened and rectangular fastener head 17' of fastener 16', and by preventing rotation of fastener head 17' while the distal end of fastener 16' seeks engagement or disengagement with knob/nut 4', knob/nut 4' and fastener 16' together can be successful in tightening curved/bowed clamp arm 3' securely against clamp base 9' to achieve secure installation of float housing 2 on a supporting pan wall. In FIG. 21 the clamp base 9' and curved/bowed clamp arm 3' are both absent to better reveal a preferred configuration of connective structure 15', including its 3-sided upper structure providing the upper portion of a vertically-extending keyway 41 and a closely-associated protective channel for fastener head 17' so that when the elevation of float housing 2 is adjusted in situ while in its installed position of use on a supporting fluid collection pan 40 (or other configuration of drain pan), keyway 41 can have easy and unobstructed up and down elevation-adjusting movement relative to fastener head 17' (while fastener 16' maintains fixed positioning of clamp base 9' to curved/bowed clamp arm 3', and fixed positioning of both to the fluid collection pan (40, or other) supporting them and float housing 2. The vertically-extending keyway 41 is sized only for insertion therethrough of the fastener 16' body, and not fastener head 17', which is maintained within a protective channel formed closely around fastener head 17' during elevation adjustment activity involving float housing 2. The side view of float housing 2 in FIG. 21 also shows the vertically-extending keyway 41 centered laterally within connective structure 15' present between float housing 2 and clamp base 9' (but only integral to float housing 2). With the key 42 and guide rails 43 fixed to clamp base 9' guiding the vertical movement of keyway 41 and the float housing 2 integral to keyway 41, the elevation adjustment limit of float housing 2 is the distance relative to clamp base 9' that key 42 travels between the top and bottom ends of keyway 41. The 3-sided extension of the upper portion of connective structure 15' (shown in FIG. 21 creating a protective channel for fastener head 17') is situated above the union of cap top 5 to float housing 2 (with a portion of cap top 5 visible through the upper part of keyway 41).

In contrast, FIG. 22 contains two illustrations. The left illustration is a side view of the cap top 5, second preferred embodiment of clamp 39', and the float housing 2 with a vertical section line marked as A-A superimposed thereon and extending through the connective structure 15' integral to float housing 2. The right illustration of FIG. 22 is a section view marked as SECTION A-A which shows the present invention clamp base 9', the anti-rotational and fastener-stabilizing connective structure 15' associated with float housing 2, and the key-to-keyway (42/41) connection between the clamp base 9' and float housing 2. In addition, FIG. 22 shows a fastener head 17' situated above the key 42, the fastener head 17' obscuring the fastener opening/hole in clamp base 9' and the attached fastener body 16' extending through it and away from the viewer behind head 17', while the key 42 extends toward the viewer through the vertically-extending keyway 41 formed into the anti-rotational and fastener-stabilizing structure 15'. FIG. 22 also shows the fastener head 17' closely surrounded by fastener stabilizing structure 15' that creates a protective channel around fastener head 17' during upward or downward movement of keyway 41 and float housing 2 during their elevation adjustment activity relative to clamp arm 3' and clamp base 9' that remain in fixed association with the supporting fluid collection wall (40, or other). A void space (not shown) extending between the float housing 2 or cap top 5, and the 3-sided upper extension supported by the anti-rotational and fastener-stabilizing structure 15' integral to float housing 2, provides the lower portion of the protective channel moveable relative to fastener head 17' while float housing 2 is raised or lowered during elevation adjustment for stable mounting thereof onto a fluid collection pan wall (40 or other). The anti-rotational connective structure 15' further allows increased ease in adjustment of float housing 2 elevation relative to fluid collection pan 40 (or other fluid collection pan, not shown), as well as distribution of forces to which float housing 2 may be subjected during use that helps to maintain the present invention switch 1 in its original installed position of use on the wall of a fluid collection pan 40 (or other).

To install the height-adjustable embodiment of the present invention into its desired position of use for fluid monitoring and a fluid-producing system shut-off response when excess fluid protection is detected beyond that calculated to avoid/prevent damage to the associated fluid-producing system or its surroundings, one would first disconnect power to the fluid-producing system, thereafter establishing an electrical circuit that includes both the fluid-producing system and present invention latching magnetic float switch 1. The initial tight nut/knob 4' connection with fastener 16' should then be slightly released to loosen/relax the connection between clamp arm 3' and clamp base 9' enough to place the clamp arm 3' and clamp base 9' over and against the opposing surfaces of a supporting and vertically-extending fluid collection pan wall (40 or other). Once clamp arm 3' and clamp base 9' are in a desired position of use relative to the pan wall (40 or other), nut/knob 4' is then tightened against fastener 16' (but not fully tightened, so that float housing 2 and the vertically-extending keyway 41 still remain movable relative to fastener head 17'). Thereafter, fingers lightly pushing downwardly against the cap top 5 can move float housing 2 in a downwardly direction relative to clamp base 9' until the bottom of float housing 2 reaches the elevation desired for it during use. A final tightening of the nut/knob 4' against the fastener 16' finishes the installation. Once the electrical circuit that includes wiring harness 8 is tested and found to provide appropriate TRIPPED and RUN state positioning, power between the fluid-producing system can then be restored to the RUN state position for liquid accumulation depth monitoring in the fluid collection pan (40 or other) in fluid communication with the fluid-producing system (not shown) and now supporting float housing 2. To test switch 1 at any time during operation (without removal of the present invention from its installation site), one simply uses a finger to manually raise the pivoting free end projection 28 of the float assembly 29 extending through the open channel 18 in float housing 2 until a sharp/fast upward snapping/latching occurs. If the present invention float switch 1 is properly wired, the associated fluid-producing system should cease operation. A one-finger manual reset of the float magnet 35 to its offset RUN state position can then be accomplished via the same pivoting free end projection 28 extending beyond the open channel 18 in float housing 2 to place the float assembly 29 (still inside the float housing) back into its lowered RUN state position where float magnet 35 is offset from toggle bar magnet 34, creating a large gap between them that lessens the magnetic attraction to one another. To test responsiveness of the installed present invention latching magnetic float switch 1, one can fill the associated/supporting fluid collection pan (40 or other) with water and ensure that when the sharp/fast upward snapping/latching occurs the associated fluid-producing system stops before the supporting pan (40 or other) overflows with water. The 2-part present invention clamp has rugged construction and assembly, and is unlikely to experience premature failure even if fastener 16' is in a loosened state, as separation of clamp arm 3' from clamp base 9' is only possible when upwardly rotated away from clamp base 9' and in a vertically-extending orientation. If clamp arm 3' and clamp base 9' become separated, reassembly is quick and easy by insertion of fastener 16' through alignment spring 38, and while a slight force is applied to the clamp arm 3' urging it toward clamp base 9'. The fastener alignment spring 38 then helps to line up the externally-threaded end of fastener 16' with the hole/opening 11' (preferably keyhole shaped) through clamp arm 3', thereafter allowing nut/knob 4' to progressively engage the externally-threaded body of fastener 16' to tighten the upper portions of clamp arm 3' and clamp base 9' together over and against a supporting pan wall (40 or other) so that latching magnetic float switch 1 can again monitor the depth of liquid accumulation in the supporting pan use once adjustment of float housing 2 to the needed elevation relative to the interior bottom surface of the pan is also made.

While the written description of the invention herein is intended to enable one of ordinary skill to make and use its best mode, it should also be appreciated that the invention disclosure only provides examples of specific embodiments and methods, and many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

I claim:

1. A latching magnetic float switch for selectively controlling a flow of electricity to a fluid-producing system and attachable onto a wall of a fluid collection pan in fluid communication with the fluid-producing system, said latching magnetic float switch comprising:

a float housing having at least one bottom fluid passage opening, an enclosed top end, a vertically-extending open channel, a wiring harness with two opposing ends and one of said opposing wiring harness ends outside said float housing with the other one of said opposing wiring harness ends in electrical communication with two sets of paired electrical contacts inside said float housing, one electrical contact of each said set of paired electrical contacts supported by a pivoting toggle bar inside said float housing, said toggle bar having a first end and an opposed second end, said first and second toggle bar ends each movable between raised and lowered positioning, said toggle bar movement causing said first end to become raised when said second end moves to said lowered positioning and alternatively causing said second end to become raised when said first end moves to said lowered positioning, one of said ends of said toggle bar also supporting a toggle bar magnet and having upward biasing influence maintaining said toggle bar end supporting said toggle bar magnet in said raised positioning, said float housing further having at least one float magnet associated with a float assembly pivotably movable within said float housing between an offset lowered position close in elevation to said at least one bottom fluid passage opening and a predetermined raised actuator position configured to overcome said upward biasing influence maintaining said raised positioning of said toggle bar magnet and preserving a gap between said float and toggle bar magnets such that one set of said paired electrical contacts maintains a closed electrical circuit with said wiring harness until said float magnet through pivotal movement reaches said predetermined raised actuator position, said float assembly further having a free end projection extending outside said float housing through said open channel and said free end projection changing in elevation outside said float housing concurrently with movement of said float assembly and said float magnet from said offset lowered position to said predetermined raised actuator position, and when said float magnet through pivotal movement reaches said predetermined raised actuator position, magnetic attraction of said float magnet on said toggle bar magnet overcomes said upward biasing influence, allowing said toggle bar magnet to quickly drop in elevation and cause a fast-snapping and strong magnetic latching together of said float magnet and said toggle bar magnet that shuts off electrical communication in the electrical circuit to which said wiring harness is connected, said strong magnetic latching together of said float magnet and said toggle bar magnet thereafter remaining until said free end projection extending through said vertically-extending open channel in said float housing is manually lowered;

a clamp comprising a clamp base, a clamp arm, an externally-threaded fastener having a distal end and an opposed fastener head with a rotation-resisting configuration, and a nut with an internally-threaded extension configured for threaded engagement with said distal end of said fastener, and said clamp base having an upper portion with a top edge having opposed receiving notches, said clamp arm having a curved and bowed configuration adapted for receiving metal and plastic fluid collection pans with differing upper wall configurations and draft angles, said clamp arm further having an upper portion with fastener opening sized and configured for insertion therethrough of said nut extension and a top edge with an incorporated pivot pin configuration allowing pivotal connection of said top edge pivot pin configuration with said opposed receiving notches in said clamp base and pivoting movement of said clamp arm relative to said clamp base between a downwardly-extending closed position of use and an upward fully-extended release position allowing separation of said clamp arm from said clamp base; and a fastener head stabilizing structure configured to prevent rotation of said fastener head during threaded engagement and disengagement of said fastener and said nut, wherein when said top edges of said clamp arm and said clamp base are joined together for pivotal movement, and further wherein when said clamp arm and said clamp base are placed together securely over and against the opposing surfaces of a selected one of the walls of a fluid collection pan with said fastener and said nut in threaded engagement together that securely fixes positioning of said clamp arm and said clamp base each firmly against a different one of the opposing surfaces of the pan wall, and also wherein when said wiring harness is electrically connected into the electrical circuit of a fluid-producing system in fluid communication with the fluid collection pan, and further when said at least one fluid passage opening of said float housing is adjacent to the interior bottom surface of the fluid collection pan, if liquid from said fluid-producing system accumulates in the fluid collection pan supporting said clamp arm and said clamp base in excess of a predetermined threshold amount indicating potential harm to the fluid-producing system and surroundings, and the accumulated liquid then enters said fluid housing via said at least one fluid passage opening, when depth of liquid in said float housing moves said float magnet a distance toward said predetermined raised actuator position, increasingly accelerating magnetic attraction of said float magnet to said toggle bar magnet thereafter moves said float magnet into said raised actuator position, with strong magnetic force between said magnets then overcoming said upwardly biasing influence on said toggle bar magnet that maintains electrical communication between said wiring harness and the fluid-producing system in fluid communication with the fluid collection pan supporting said latching magnetic float switch, and when said upward biasing influence is overcome, said toggle bar magnet experiences a fast and forceful downward pivotal movement that places said toggle bar magnet into strong snap-locked latching magnetic engagement with said float magnet, interrupting electrical communication between said wiring harness and the fluid-producing system, thereby shutting off fluid production until manual manipulation of said free end projection extending outside said float housing through said open channel lowers and resets said float magnet into said offset lowered position, and when said manual manipulation is completed, said toggle bar magnet returns to said upwardly biased raised positioning that maintains said gap between said float magnet and said toggle bar magnet, and fluid production by said fluid-producing system is then restored and maintained until liquid accumulation in the fluid collection pan supporting said latching magnetic float switch exceeds said predetermined threshold depth indicating potential harm and then enters said fluid housing via said at least one fluid passage opening, and causes new movement of said float magnet toward said raised actuator position.

2. A device, comprising:

a housing including a base and a wall, wherein the base defines an opening, wherein the wall extends from the base;

a float extending within the housing, wherein the float is pivotally coupled to the base such that the float is configured to pivotally move within the housing relative to the housing between a first position proximal to the base and a second position distal to the base, wherein the float hosts a first magnet;

a toggle extending within the housing such that the float extends between the base and the toggle, wherein the toggle hosts a second magnet; and a clamp coupled to the wall, wherein the clamp is configured to clamp onto a pan configured to receive a liquid such that the housing is movable relative the pan along a vertical plane when the pan rests along a horizontal plane and the liquid urges the float to pivotally move within the housing relative to the housing from the first position to the second position such that the first magnet is attracted to the second magnet when the liquid enters the housing through the opening towards the toggle and rises along the wall, wherein at least one of:
  (a) further comprising a spring positioned within the housing, wherein the spring engages the toggle to enable the toggle to seesaw;
  (b) wherein the toggle seesaws within the housing relative to the housing toward the float based on the second magnet being attracted to the first magnet when the liquid urges the float to pivotally move within the housing relative to the housing from the first position to the second position such that the first magnet is attracted to the second magnet when the liquid enters the housing through the opening towards the toggle;
  (c) further comprising a material positioned within the housing, wherein the material attracts the second magnet when the float is positioned in the first position, wherein the toggle extends between the base and the material; or
  (d) the base is a plate defining the opening only along the horizontal plane.

3. The device of claim 2, wherein the wall defines a channel, wherein the float includes a protrusion distal to the base, wherein the protrusion moves within the channel as the liquid urges the float to pivotally move within the housing relative to the housing from the first position to the second position such that the first magnet is attracted to the second magnet when the liquid enters the housing through the opening towards the toggle to visually indicate the liquid entering the housing through the opening.

4. The device of claim 2, wherein the housing includes a wet portion and a dry portion, wherein the wet portion houses the float, wherein the dry portion houses the toggle, wherein the wet portion includes the base.

5. The device of claim 4, further comprising:
  a wire extending from the dry portion outside the housing, wherein the wire is configured to electrically couple to an electrical load of a producer of the liquid outside of the housing to interrupt an electrical power to the electrical load to reduce the liquid flowing into the pan.

6. The device of claim 5, wherein the electrical load does not enable the liquid to be produced by the producer when the float is positioned in the second position as the clamp is clamping onto the pan receiving the liquid and the wire is electrically coupled to the electrical load.

7. The device of claim 2, wherein (a) further comprising the spring positioned within the housing, wherein the spring engages the toggle to enable the toggle to seesaw.

8. The device of claim 2, wherein (b) wherein the toggle seesaws within the housing relative to the housing toward the float based on the second magnet being attracted to the first magnet when the liquid urges the float to pivotally move within the housing relative to the housing from the first position to the second position such that the first magnet is attracted to the second magnet when the liquid enters the housing through the opening towards the toggle.

9. The device of claim 2, further comprising:
  a plurality of electrical contacts extending within the housing such the toggle extends between the base and the electrical contacts, wherein the electrical contacts are configured to alternately contact the toggle depending on how the toggle is positioned within the housing based on the float being positioned in the first position or the second position.

10. The device of claim 9, wherein the toggle extends between the float and the electrical contacts.

11. The device of claim 2, wherein (c) further comprising the material positioned within the housing, wherein the material attracts the second magnet when the float is positioned in the first position, wherein the toggle extends between the base and the material.

12. The device of claim 11, wherein the toggle extends between the float and the material.

13. The device of claim 2, wherein the float includes a support and a buoyant portion, wherein the support is assembled with the buoyant portion, wherein the buoyant portion encloses the first magnet, wherein the support faces the base.

14. The device of claim 2, wherein (d) the base is a plate defining the opening only along the horizontal plane.

15. A method, comprising:
  causing a user to access a device, wherein the device includes a housing, a float, a toggle, and a clamp, wherein the housing including a base and a wall, wherein the base defines an opening, wherein the wall extends from the base, wherein the float extending within the housing, wherein the float is pivotally coupled to the base such that the float is configured to pivotally move within the housing relative to the housing between a first position proximal to the base and a second position distal to the base, wherein the float hosts a first magnet, wherein the toggle extending within the housing such that the float extends between the base and the toggle, wherein the toggle hosts a second magnet, wherein the clamp coupled to the wall; and
  causing the user to operate the clamp such that the clamp clamps onto a pan configured to receive a liquid such that the housing is movable relative the pan along a vertical plane when the pan rests along a horizontal plane and the liquid urges the float to pivotally move within the housing relative to the housing from the first position to the second position such that the first magnet is attracted to the second magnet when the liquid enters the housing through the opening towards the toggle and rises along the wall,
  wherein at least one of:
    (a) the device further comprising a spring positioned within the housing, wherein the spring engages the toggle to enable the toggle to seesaw;
    (b) wherein the toggle seesaws within the housing relative to the housing toward the float based on the second magnet being attracted to the first magnet when the liquid urges the float to pivotally move within the housing relative to the housing from the first position to the second position such that the first magnet is attracted to the second magnet when the liquid enters the housing through the opening towards the toggle;
    (c) the device further comprising a material positioned within the housing, wherein the material attracts the second magnet when the float is positioned in the first position, wherein the toggle extends between the base and the material; or
    (d) the base is a plate defining the opening only along the horizontal plane.

16. The method of claim 15, wherein the wall defines a channel, wherein the float includes a protrusion distal to the base, wherein the protrusion moves within the channel as the liquid urges the float to pivotally move within the housing relative to the housing from the first position to the second position such that the first magnet is attracted to the second magnet when the liquid enters the housing through the opening towards the toggle to visually indicate the liquid entering the housing through the opening.

17. The method of claim 15, wherein the housing a wet portion and a dry portion, wherein the wet portion houses the float, wherein the dry portion houses the toggle, wherein the wet portion includes the base.

18. The method of claim 17, wherein the device includes a wire extending from the dry portion outside the housing, and further comprising:
    causing the wire to electrically couple to an electrical load of a producer of the liquid outside of the housing to interrupt an electrical power to the electrical load to reduce the liquid flowing into the pan.

19. The method of claim 18, wherein the electrical load does not enable the liquid to be produced by the producer when the float is positioned in the second position as the clamp is clamping onto the pan receiving the liquid and the wire is electrically coupled to the electrical load.

20. The method of claim 15, wherein (a) the device includes the spring positioned within the housing, wherein the spring engages the toggle to enable the toggle to seesaw.

21. The method of claim 15, wherein (b) wherein the toggle moves seesaws within the housing relative to the housing toward the float based on the second magnet being attracted to the first magnet when the liquid urges the float to pivotally move within the housing relative to the housing from the first position to the second position such that the first magnet is attracted to the second magnet when the liquid enters the housing through the opening towards the toggle.

22. The method of claim 15, wherein the device includes a plurality of electrical contacts extending within the housing such the toggle extends between the base and the electrical contacts, wherein the electrical contacts are configured to alternately contact the toggle depending on how the toggle is positioned within the housing based on the float being positioned in the first position or the second position.

23. The method of claim 22, wherein the toggle extends between the float and the electrical contacts.

24. The method of claim 15, wherein (c) the device includes the material positioned within the housing, wherein the material attracts the second magnet when the float is positioned in the first position, wherein the toggle extends between the base and the material.

25. The method of claim 24, wherein the toggle extends between the float and the material.

26. The method of claim 15, wherein the float includes a support and a buoyant portion, wherein the support is assembled with the buoyant portion, wherein the buoyant portion encloses the first magnet, wherein the support faces the base.

27. The method of claim 15, wherein (d) the base is a plate defining the opening only along the horizontal plane.

28. A method, comprising:
    supplying a device to an end user, wherein the device includes a housing, a float, a toggle, and a clamp, wherein the housing including a base and a wall, wherein the base defines an opening, wherein the wall extends from the base, wherein the float extending within the housing, wherein the float is pivotally coupled to the base such that the float is configured to pivotally move within the housing relative to the housing between a first position proximal to the base and a second position distal to the base, wherein the float hosts a first magnet, wherein the toggle extending within the housing such that the float extends between the base and the toggle, wherein the toggle hosts a second magnet, wherein the clamp coupled to the wall; and
    causing the end user to clamp the clamp onto a pan configured to receive a liquid such that the housing is movable relative the pan along a vertical plane when the pan rests along a horizontal plane and the liquid urges the float to pivotally move within the housing relative to the housing from the first position to the second position such that the first magnet is attracted to the second magnet when the liquid enters the housing through the opening towards the toggle and rises along the wall,
    wherein at least one of:
    (a) the device further comprising a spring positioned within the housing, wherein the spring engages the toggle to enable the toggle to seesaw;
    (b) wherein the toggle seesaws within the housing relative to the housing toward the float based on the second magnet being attracted to the first magnet when the liquid urges the float to pivotally move within the housing relative to the housing from the first position to the second position such that the first magnet is attracted to the second magnet when the liquid enters the housing through the opening towards the toggle;
    (c) the device further comprising a material positioned within the housing, wherein the material attracts the second magnet when the float is positioned in the first position, wherein the toggle extends between the base and the material; or
    (d) the base is a plate defining the opening only along the horizontal plane.

29. The method of claim 28, wherein (d) the base is a plate defining the opening only along the horizontal plane.

30. A device, comprising:
    a housing;
    a float configured to move relative to the housing between a first position and a second position, wherein the float hosts a first magnet;
    a toggle extending within the housing, wherein the toggle hosts a second magnet; and
    a clamp coupled to the housing, wherein the clamp is configured to clamp onto a pan configured to receive a liquid such that the housing is movable along a vertical plane when the pan rests along a horizontal plane and the liquid urges the float to move relative to the housing from the first position to the second position such that the first magnet is attracted to the second magnet, wherein the liquid enters the housing against gravity to urge the float within the housing, wherein at least one of:
    (a) further comprising a spring positioned within the housing and engaging the toggle to enable the toggle to seesaw;
    (b) wherein the housing includes an opening, wherein the toggle seesaws within the housing relative to the housing toward the float based on the second magnet being attracted to the first magnet when the liquid urges the float to pivotally move within the housing relative to the housing from the first position to the second position such that the first magnet is attracted to the second magnet when the liquid enters the housing through the opening towards the toggle;
    (c) wherein the housing includes a base, and further comprising a material positioned within the housing, wherein the material attracts the second magnet when the float is positioned in the first position, wherein the toggle extends between the base and the material; or (d) wherein the housing includes a base, wherein the base is a plate defining an opening only along the horizontal plane, wherein the opening enables the liquid to enter the housing.

31. The device of claim 30, wherein at least two of (a), (b), (c), or (d).

32. The device of claim 30, wherein at least three of (a), (b), (c), or (d).

* * * * *